United States Patent
Malur Srinivasan et al.

(10) Patent No.: US 11,928,185 B2
(45) Date of Patent: Mar. 12, 2024

(54) INTERPRETABILITY ANALYSIS OF IMAGE GENERATED BY GENERATIVE ADVERSERIAL NETWORK (GAN) MODEL

(71) Applicant: FUJITSU LIMITED, Kawasaki (JP)

(72) Inventors: Ramya Malur Srinivasan, San Diego, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 372 days.

(21) Appl. No.: 17/449,335

(22) Filed: Sep. 29, 2021

(65) Prior Publication Data
US 2023/0100740 A1 Mar. 30, 2023

(51) Int. Cl.
*G06K 9/62* (2022.01)
*G06F 18/21* (2023.01)
*G06F 18/213* (2023.01)
*G06F 18/214* (2023.01)
(Continued)

(52) U.S. Cl.
CPC .......... *G06F 18/217* (2023.01); *G06F 18/213* (2023.01); *G06F 18/214* (2023.01); *G06F 18/24133* (2023.01); *G06F 18/2431* (2023.01)

(58) Field of Classification Search
CPC .... G06F 18/217; G06F 18/213; G06F 18/214; G06F 18/24133; G06F 18/2431; G06N 3/0442; G06N 3/045; G06N 3/0464; G06N 3/0475; G06N 3/088; G06N 3/094; G06V 10/774; G06V 10/82
See application file for complete search history.

(56) References Cited

U.S. PATENT DOCUMENTS 10,572,979 B2 * 2/2020 Vogels ................ G06F 18/2113
2018/0293712 A1 * 10/2018 Vogels ................... G06N 3/047
(Continued)

FOREIGN PATENT DOCUMENTS

WO WO-2021201774 A1 * 10/2021

OTHER PUBLICATIONS

European Patent Office [EPO], Extended European Search Report and Written Opinion prepared in connection with counterpart application EP 22 189 695.4, and dated Jan. 23, 2023, 7 pages.
(Continued)

*Primary Examiner* — Xin Jia
(74) *Attorney, Agent, or Firm* — Fujitsu Intellectual Property Center

(57) ABSTRACT

In an embodiment, a GAN model is trained based on an image dataset. A set of images of a first class is generated by the GAN model. Further, a first saliency map of a first generated image is determined by a neural network model. A second saliency map of a second image, belonging to the first class, from image dataset is determined by the neural network model. A first interpretability coefficient is determined, based on the first and second saliency maps. A first typicality score between the first generated image and a first set of images, belonging to the first class, from the image dataset, is determined. A second typicality score between a pair of generated images is determined. A second interpretability coefficient is determined basis the first and second typicality scores. An interpretability score associated with the GAN model is determined based on the first and second interpretability coefficients.

20 Claims, 8 Drawing Sheets

(51) Int. Cl.
 G06F 18/2413 (2023.01)
 G06F 18/2431 (2023.01)

(56) References Cited

U.S. PATENT DOCUMENTS

2018/0293713 A1\* 10/2018 Vogels ............... G06F 18/2113
2020/0143522 A1\* 5/2020 Vogels ..................... G06N 3/08

OTHER PUBLICATIONS

Voynov Andrey, and Artem Babenko "Unsupervised Discovery of Interpretable Directions in the GAN Latent Space." arxiv.org, Cornell University Library, arXiv, 2022.03754v3 [cs.LG] Jun. 24, 2020.
Bau, David, et al. "Network Dissection: Quantifying Interpretability of Deep Visual Representations.", Apr. 19, 2017, arXiv. org>cs>arXiv:1704.05796v1, 9 pages.
Bengio, Yoshua, Aaron Courville, and Pascal Vincent. "Representation Learning: A Review and New Perspectives.", Apr. 23, 2014, arXiv.org > cs > arXiv: 1206.5538v3, 30 pages.
Chen Xi, et al. "InfoGAN: Interpretable Representation Learning by Information Maximizing Generative Adversarial Nets." Jun. 12, 2016, arXiv.org>cs>arXiv:1606.03657v3, 14 pages.
Cornia, Marcella, et al. "Predicting Human Eye Fixations via an LSTM-based Saliency Attentive Model.", Jul. 9, 2018, arXiv.org > cs > arXiv: 1611.09571v4, 13 pages.
Denton, Emily, et al. "Deep generative image models using a laplacian pyramid of adversarial networks." Jun. 18, 2015, arXiv. org>arXiv:1506.05751v1, 10 pages.
Ehinger, Krista A. et al. "Estimating scene typicality from human ratings and image features." in Proceedings of the 33rd Annual Cognitive Science Conference, COGSCI 2011, Boston, Massachusetts, Wednesday, Jul. 20-Saturday Jul. 23, 2011, Version: Author's final manuscript, http:/hdl.handle.net/1721.1/71190, 6 pages.
Frintrop, S., P. Jensfelt, and H. I. Christensen. "Attentional Landmark Selection for Visual SLAM." 2006 IEEE/RSJ International Conference on Intelligent Robots and Systems. Oct. 9-15, 2006, Beijing, China, 6 pages.
Gatys, Leon A., Alexander S. Ecker, and Matthias Bethge. "A neural algorithm of artistic style." Sep. 2, 2015, arXiv.org > cs > arXiv: 1508.06576V2, 16 pages.
Goodfellow Ian, et al. "Generative adversarial nets." Advances in neural information processing systems 27 (2014), 9 pages.
Gunning David, "explainable artificial intelligence (XAI) program.", DARPA/120, (date unknown) retrieved from https://www.cc.gatech.edu/~alanwags/DLAI2016/(Gunning)%20IJCAI-16%20DLAI%20WS.pdf, 18 pages.
Gurumurthy Swaminathan, Ravi Kiran Sarvadevabhatla, and Venkatesh Babu Radhakrishnan. "DeLiGAN: Generative Adversarial Networks for Diverse and Limited Data.", Jun. 7, 2017, arXiv.org > cs > arXiv:1706.02071v1, 9 pages.

Heckel Reinhard, et al. "Scalable and interpretable product recommendations via overlapping co-clustering.", May 17, 2017, arXiv.org > cs > arXiv:1604.02071v2, 12 pages.
Hendricks, Lisa Anne, et al. "Generating visual explanations.", Mar. 28, 2016, arXiv.org > cs > arXiv: 1603.08507v1, 17 pages.
Itti, Laurent. "Automatic foveation for video compression using a neurobiological model of visual attention." IEEE transactions on image processing 13.10 (2004): pp. 1304-1318.
Itti, Laurent, and Christof Koch. "A saliency-based search mechanism for overt and covert shifts of visual attention." Vision research 40.10-12 (2000): pp. 1489-1506.
Johnson Justin, Alexandre Alahi, and Li Fei-Fei. "Perceptual losses for real-time style transfer and super-resolution.", Mar. 27, 2016, arXiv.org > cs > arXiv:1603.08155, 18 pages.
Kümmerer, Matthias, Thomas SA Wallis, and Matthias Bethge. "DeepGaze II: Reading fixations from deep features trained on object recognition." Oct. 15, 2016, arXiv.org > cs > arXiv:1610.01563v1, 16 pages.
Lopez-Paz, David, and Maxime Oquab. "Revisiting classifier two-sample tests." International Conference on Learning Representations. 2017, 14 pages.
Radford, Alec, Luke Metz, and Soumith Chintala. "Unsupervised representation learning with deep convolutional generative adversarial networks.", Jan. 7, 2016, arXiv.org > cs > arXiv:1511.06434v2, 16 pages.
Reed Scott, et al. "Generative adversarial text to image synthesis.", Jun. 5, 2016, arXiv.org > cs > arXiv: 1605.05396v2, 10 pages.
Ribeiro Marco Tulio, Sameer Singh, and Carlos Guestrin. ""Why should i trust you?" Explaining the predictions of any classifier.", Aug. 9, 2016, arXiv.org > cs > arXiv:1602.04938v3, 10 pages.
Saleh, Babak, Ahmed Elgammal, and Jacob Feldman. "The role of typicality in object classification: Improving the generalization capacity of convolutional neural networks." Feb. 9, 2016, arXiv.org > cs > arXiv: 1602.02865v1, pp. 8.
Salimans, Tim, et al. "Improved Techniques for Training GANs.", Jun. 10, 2016, arXiv.org > cs > arXiv: 1606.03498v1, 10 pages.
Siagian, Christian, and Laurent Itti. "Biologically-inspired robotics vision monte-carlo localization in the outdoor environment." 2007 IEEE/RSJ International Conference on Intelligent Robots and Systems. IEEE, 2007, 8 pages.
Srinivasan, Ramya, Conrad Rudolph, and Amit K. Roy-Chowdhury. "Computerized face recognition in renaissance portrait art: A quantitative measure for identifying uncertain subjects in ancient portraits.", published in IEEE Signal Processing Magazine 32.4 (2015): at pp. 85-94, retrieved from https://citeseerx.ist.psu.edu/viewdoc/download?doi=10.1.1.697.2880&rep=rep1&type=pdf, 5 pages.
Tenenbaum Joshua B., and William T. Freeman. "Separating style and content with bilinear models." Neural computation 12.6 (2000): 1247-1283.
Vogel, J. "A semantic typicality measure for natural scene categorization." Lecture notes in computer science 3175 (2004), 8 pages.
Yang Jianwei, et al. "Lr-gan: Layered recursive generative adversarial networks for image generation.", Aug. 2, 2017, arXiv.org >cs > arXiv:1703.01560v1, 21 pages.

\* cited by examiner

INTERPRETABILITY ANALYSIS OF IMAGE GENERATED BY GENERATIVE ADVERSERIAL NETWORK (GAN) MODEL

FIELD

The embodiments discussed in the present disclosure are related to interpretability analysis of an image generated by a Generative Adversarial Network (GAN) model.

BACKGROUND

Advancements in the field of machine learning have led to development of numerous Artificial Intelligence (AI) models. One such AI model is a Generative Adversarial Network (GAN) model. An advantage of the GAN model is that the GAN model may generate unseen datapoints, given a set of training datapoints. For example, the GAN model may generate a new image of a dog category, given a training dataset of images of the dog category. The GAN model includes a first neural network model (referred as a generator model) and a second neural network model (referred as a discriminator model). The output of the generator model may be fed as the input of the discriminator model in the GAN model. The goal of the generator model may be to output a random variable that emulates a target distribution. The goal of the discriminator model may be to classify an input random variable into a first category that may indicate that the input random variable may belong to the target distribution or classify the input random variable into a second category that may indicate that the input random variable may not belong to the target distribution. To train the GAN model, a pre-trained discriminator model may be used and the generator model may be progressively trained such that the generator model may be able to influence a discrimination-ability of the discriminator model. In other words, when trained, the generator model may be able to generate a random variable which may be so close to the target distribution that the discriminator model may not be able to accurately classify the generated random variable as a true target distribution value or a value from the generator model.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations which may include receiving an image dataset. The set of operations may further include training a Generative Adversarial Network (GAN) model based on the received image dataset. The set of operations may further include generating, by the GAN model, a set of images each associated with a first class from a set of classes associated with the received image dataset. The set of operations may further include determining, by a neural network model different from the GAN model, a first saliency map associated with a first image from the generated set of images. The set of operations may further include determining, by the neural network model, a second saliency map associated with a second image from the received image dataset, the second image is associated with the first class. The set of operations may further include determining a first interpretability coefficient associated with the trained GAN model, based on the determined first saliency map and the determined second saliency map. The set of operations may further include determining a first typicality score between a first set of images from the received image dataset and the first image, based on the trained GAN model, wherein each of the first set of images is associated with the first class. The set of operations may further include determining a second typicality score between a pair of images from the generated set of images, based on the trained GAN model. The set of operations may further include determining a second interpretability coefficient associated with the trained GAN model, based on the determined first typicality score and the determined second typicality score. The set of operations may further include determining an interpretability score associated with the trained GAN model based on the determined first interpretability coefficient and the determined second interpretability coefficient. The set of operations may further include rendering the determined interpretability score on a display device.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
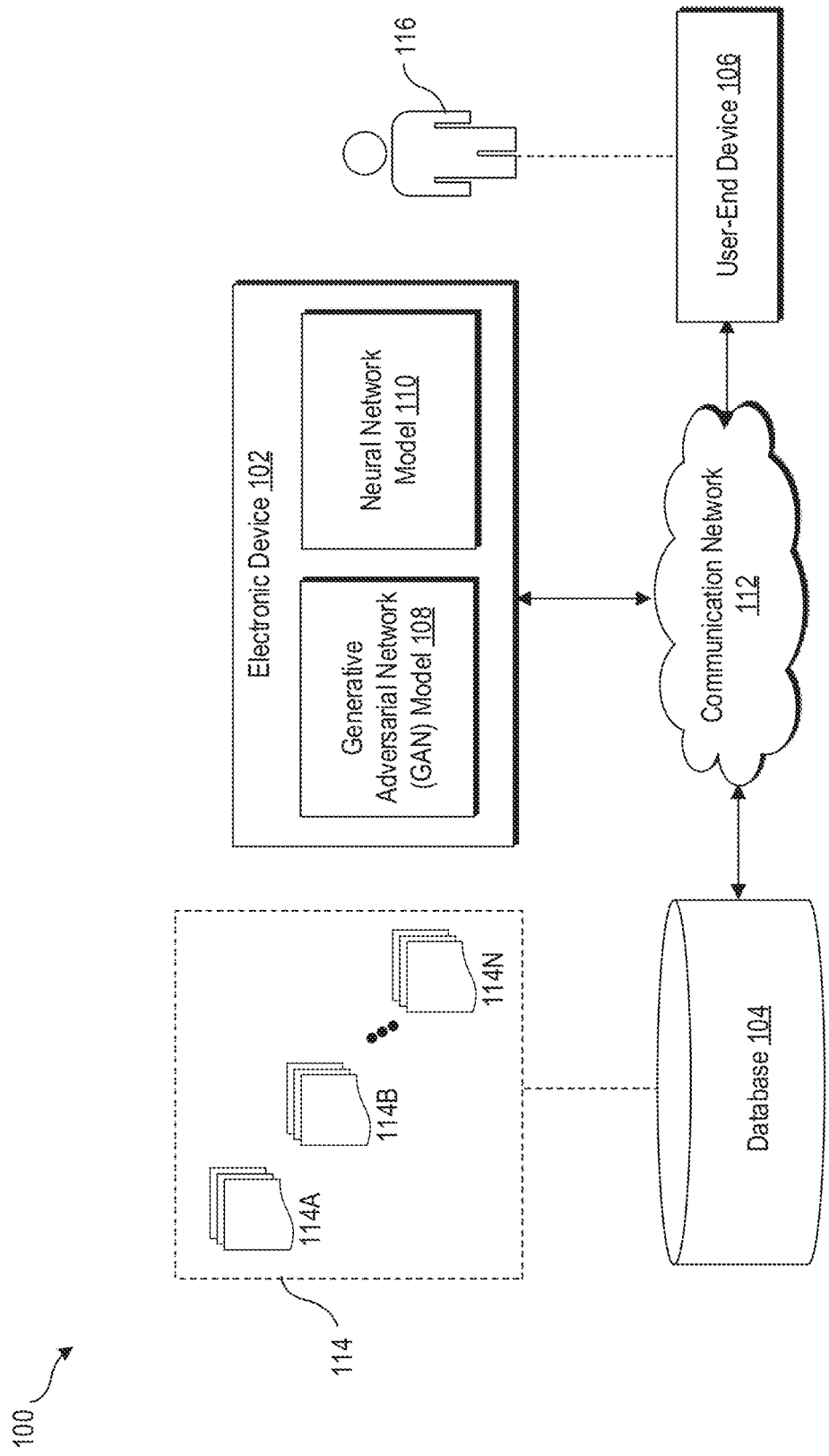
FIG. 1 is a diagram representing an example environment related to interpretability analysis of an image generated by a Generative Adversarial Network (GAN) model.

Some embodiments described in the present disclosure relate to methods and systems for an interpretability analysis of images generated by a Generative Adversarial Network (GAN) model. In the present disclosure, an image dataset may be received. The GAN model may be trained based on the received image dataset. Further, a set of images may be generated by the trained GAN model. Each of the set of images may be associated with a first class from a set of classes associated with the received image dataset. Thereafter, a first saliency map associated with a first image (i.e. from the generated set of images) may be determined by a neural network model different from the GAN model. Further, a second saliency map associated with a second image from the received image dataset may be determined by the neural network model. The second image may be associated with the first class. Thereafter, a first interpretability coefficient associated with the trained GAN model may be determined, based on the determined first saliency map and the determined second saliency map. Further, a first typicality score may be determined between a first set of images from the received image dataset and the first image, based on the trained GAN model. Herein, each of the first set of images may be associated with the first class. Also, a second typicality score may be determined between a pair of images from the generated set of images, based on the trained GAN model. Thereafter, a second interpretability coefficient associated with the trained GAN model may be determined, based on the determined first typicality score and the determined second typicality score. Further, an interpretability score associated with the trained GAN model may be determined based on the determined first interpretability coefficient and the determined second interpretability coefficient. The determined interpretability score may be rendered on a display device.

According to one or more embodiments of the present disclosure, the technological field of interpretability of Artificial Intelligence (AI) models may be improved by configuring a computing system in a manner that the computing system may be able to analyze interpretability of images generated by a GAN model. The interpretability of the images generated by the GAN model may be analyzed based on the determination of the interpretability score associated with the GAN model. The computing system may determine the first interpretability coefficient associated with the GAN model based on the first saliency map associated with the first image generated by the GAN model, and also based on the second saliency map associated with the second image in the received image dataset of training images. The computing system may also determine the second interpretability coefficient associated with the GAN model based on the first typicality score between training images (e.g., the first set of images) and the first image, and also based on the second typicality score between a pair of images from the generated set of images. Finally, the computing system may determine the interpretability score associated with the GAN model based on a combination (e.g., a weighted combination) of the first interpretability coefficient and the second interpretability coefficient. As the computation of the interpretability score does not require human labeling, such computation may be efficient and automated. Further, the weights associated with the interpretability coefficients may be adjusted to suite an application area where the GAN model may be used. The interpretability score associated with the GAN model may be indicative of a trustworthiness of images generated by the respective GAN models. The interpretability scores of the GAN models may also be used to compare different GAN models. Also, the interpretability scores may be used to understand an underlying learning process of AI models, such as GAN models, and may also aid in development of human interpretable AI systems.

The system may be configured to receive an image dataset. The system may be configured to train a GAN model based on the received image dataset. The received image dataset may be used as a training dataset for the GAN model. Further, the system may be configured to generate, by the GAN model, a set of images each associated with a first class from a set of classes associated with the received image dataset. The system may be further configured to determine, by a neural network model different from the GAN model, a first saliency map associated with a first image from the generated set of images. The system may be configured to determine, by the neural network model, a second saliency map associated with a second image from the received image dataset. The second image may be associated with the first class. The determination of the first (or the second) saliency map is described further, for example, in FIGS. 3, 4, and 6.

The system may be further configured to apply the neural network model on the first image (or the second image) and determine a set of feature maps of the first image (or the second image) based on the application of the neural network model on the first image (or the second image). The system may be further configured to enhance, based on an Attentive model, a set of salient features from the determined set of feature maps. The system may be further configured to determine the first (or the second) saliency map based on a combination of the enhanced set of salient features and a set of learned priors associated with saliency maps.

The system may be further configured to determine a first interpretability coefficient associated with the trained GAN model, based on the first saliency map and the second saliency map. To determine the first interpretability coefficient, the system may determine a region of overlap between the determined first saliency map and the determined second saliency map. Thereafter, the system may determine the first interpretability coefficient associated with the trained GAN model, based on the determined region of overlap and the determined second saliency map. The determination of the first interpretability coefficient is described further, for example, in FIGS. 3 and 5.

The system may be further configured to determine a first typicality score between a first set of images from the received image dataset and the first image, based on the trained GAN model. Each of the first set of images may be associated with the first class. To determine the first typicality score, the system may determine a first set of distributions of feature vectors of the first set of images from the received image dataset. Further, the system may determine, by the trained GAN model, a first set of sample sequences associated with the first image from the generated set of images. Thereafter, the system may determine the first typicality score based on the determined first set of sample sequences and the determined first set of distributions. The determination of the first typicality score is described further, for example, in FIGS. 3 and 7.

The system may be further configured to determine a second typicality score between a pair of images from the generated set of images, based on the trained GAN model. To determine the second typicality score, the system may select the pair of images from the generated set of images. Further, the system may determine a second set of distributions of feature vectors of a third image from the selected pair of images. Also, the system may determine, by the trained GAN model, a second set of sample sequences associated with a fourth image from the selected pair of images. Thereafter, the system may determine the second typicality score based on the determined second set of sample sequences and the determined second set of distributions. The determination of the second typicality score is described further, for example, in FIGS. 3 and 8.

The system may be configured to identify content prototype attributes for the first class based on the determined first typicality score and the determined second typicality score. Thereafter, the system may render the identified content prototype attributes for the first class. The identification of the content prototype attributes is described further, for example, in FIG. 9.

The system may be configured to select a plurality of groups of images from the received image dataset. The system may further generate a plurality of trained GAN models, based on training of the GAN model using a respective group of images from the selected plurality of groups of images. Thereafter, the system may determine, by the plurality of trained GAN models, a first sequence associated with the first typicality score which is associated with the first image from the generated set of images (i.e. associated with the first class). Further, the system may determine, by the plurality of trained GAN models, a second sequence associated with the second typicality score which is associated with the pair of images from the generated set of images (i.e. associated with the first class). In addition, the system may identify a longest subsequence of the second sequence based on the second typicality score associated with the pair of images and a set of thresholds. The system may be further configured to identify an image in the longest subsequence as a prototype of the first class. Herein, a typicality score of the identified image may be a maximum typicality score in the longest subsequence, and the typicality score of the identified image may corresponds to the second typicality score. The identification of the prototype of the first class is described further, for example, in FIG. 10.

The system may be further configured to determine a second interpretability coefficient associated with the trained GAN model, based on the determined first typicality score and the determined second typicality score. Further, the system may be configured to determine an interpretability score associated with the trained GAN model based on the determined first interpretability coefficient and the determined second interpretability coefficient. Thereafter, the system may render the determined interpretability score on a display device. The determination of the interpretability score associated with the trained GAN model is described further, for example, in FIGS. 3, 11A, 11B, 12A, and 12B.

Typically, conventional systems may require human input, such as, human labeling of datapoints (e.g., images) for analysis of interpretability of an AI model, such as, a GAN model. Thus, conventional systems may be computationally inefficient and may not be fully automated. Further, the conventional systems may be prone to human biases associated with the labeled datapoints being analyzed. Also, scalability of the conventional systems to a large set of datapoints may be an issue due to the requirement of a human input. The disclosed system, on the other hand, may be unsupervised and may not require human labeling. Thus, the disclosed system may be computationally more efficient, easily automated, and scaled seamlessly. Also, the disclosed system may not be prone to human biases as human labeled datapoints may not be used for the interpretability score determination.

Embodiments of the present disclosure are explained with reference to the accompanying drawings.

FIG. 1 is a diagram representing an example environment related to interpretability analysis of an image generated by a Generative Adversarial Network (GAN) model, arranged in accordance with at least one embodiment described in the present disclosure. With reference to FIG. 1, there is shown an environment 100. The environment 100 may include an electronic device 102, a database 104, a user-end device 106, and a communication network 112. The electronic device 102, the database 104, and the user-end device 106 may be communicatively coupled to each other, via the communication network 112. The electronic device 102 may include a GAN model 108 and a neural network mode 110. In FIG. 1, there is further shown a user 116 who may be associated with or operating the electronic device 102 or the user-end device 106. There is further shown an image dataset 114 including an image 114A, an image 114B, . . . and an image 114N. The image dataset 114 may be stored in the database 104.

The electronic device 102 may include suitable logic, circuitry, interfaces, and/or code that may be configured to determine an interpretability score associated with the GAN model 108. The electronic device 102 may be configured to receive the image dataset 114 from the database 104. The electronic device 102 may be configured to train the GAN model 108 based on the received image dataset 114. Thereafter, the electronic device 102 may determine the interpretability score associated with the trained GAN model 108 based on a saliency matric (e.g., a first interpretability coefficient) and a typicality matric (e.g., a second interpretability coefficient) associated with the GAN model 108, as described next.

The electronic device 102 may be configured to generate, by the GAN model 108, a set of images each associated with a first class from a set of classes associated with the received image dataset 114. The electronic device 102 may be further configured to determine, by the neural network model 110 different from the GAN model 108, a first saliency map associated with a first image from the generated set of images. The electronic device 102 may be configured to determine, by the neural network mode 110, a second saliency map associated with a second image from the received image dataset. The second image may be associated with the first class. The determination of the first (or the second) saliency map is described further, for example, in FIGS. 3, 4, and 6. The electronic device 102 may be configured to determine a first interpretability coefficient associated with the trained GAN model 108, based on the first saliency map and the second saliency map. The determination of the first interpretability coefficient is described further, for example, in FIGS. 3 and 5.

The electronic device 102 may be configured to determine a first typicality score between a first set of images from the received image dataset and the first image, based on the trained GAN model 108. Each of the first set of images may be associated with the first class. The determination of the first typicality score is described further, for example, in FIGS. 3 and 7. The electronic device 102 may be configured to determine a second typicality score between a pair of images from the generated set of images, based on the trained GAN model 108. The determination of the second typicality score is described further, for example, in FIGS. 3, 8, and 10.

The electronic device 102 may be configured to identify content prototype attributes for the first class based on the determined first typicality score and the determined second typicality score. Thereafter, the electronic device 102 may render the identified content prototype attributes for the first class. The identification of the content prototype attributes is described further, for example, in FIG. 9.

The electronic device 102 may be configured to determine a second interpretability coefficient associated with the trained GAN model 108, based on the determined first typicality score and the determined second typicality score. Further, the electronic device 102 may be configured to determine the interpretability score associated with the trained GAN model 108 based on the determined first interpretability coefficient and the determined second interpretability coefficient. Thereafter, the electronic device 102 may render the determined interpretability score on a display device (for example, a display screen 212 of FIG. 2). The determination of the interpretability score associated with the trained GAN model 108 is described further, for example, in FIGS. 3, 11A, 11B, 12A, and 12B.

Examples of the electronic device 102 may include, but are not limited to, an image analysis engine or machine, a mobile device, a desktop computer, a laptop, a computer work-station, an imaging device, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The database 104 may include suitable logic, interfaces, and/or code that may be configured to store the image dataset 114. The image dataset 114 may include a set of images associated with a set of classes, such as, but not limited to, an animal face category, a human face category, a food category, a wearable category (like shoes), and the like. Though not shown in FIG. 1, in some cases, the GAN model 108 and/or the neural network model 110 may be stored on the database 104 alternatively, or in addition to, the storage on the electronic device 102. The database 104 may be a relational or a non-relational database. Also, in some cases, the database 104 may be stored on a server, such as a cloud server or may be cached and stored on the electronic device 102. The server of the database 104 may be configured to receive a query for one or more images (e.g., the image 114A) from the electronic device 102, via the communication network 112. In response, the server of the database 104 may be configured to retrieve and provide the queried one or more images to the electronic device 102 based on the received query, via the communication network 112. In some embodiments, the database 104 may include a plurality of servers stored at different locations. Additionally, or alternatively, the database 104 may be implemented using hardware including a processor, a microprocessor (e.g., to perform or control performance of one or more operations), a field-programmable gate array (FPGA), or an application-specific integrated circuit (ASIC). In some other instances, the database 104 may be implemented using a combination of hardware and software.

The user-end device 106 may include suitable logic, circuitry, interfaces, and/or code that may be configured to generate or receive the image dataset 114. For example, the user-end device 106 may include a web-client software/application or an electronic mail software, through which the user-end device 106 may receive the image dataset 114. Additionally, or alternatively, the user-end device 106 may include an image editing or processing software through which the image dataset 114 may be generated based on user input from the user 116. The user-end device 106 may upload the generated or received image dataset 114 to the electronic device 102. In addition, the user-end device 106 may upload the generated or received image dataset 114 to the database 104 for storage. The user-end device 106 may be further configured to receive the interpretability score associated with the GAN model 108 and/or content prototype attributes identified for the first class from the electronic device 102. The user-end device 106 may render the received the interpretability score associated with the GAN model 108 and/or the content prototype attributes identified for the first class on a display screen of the user-end device 106 for the user 116. In some embodiments, the user-end device 106 may receive a query from the user 116 to determine the interpretability score associated with the GAN model 108. The user-end device 106 may further send the query to the electronic device 102 and initiate the determination of the interpretability score by the electronic device 102. Examples of the user-end device 106 may include, but are not limited to, a mobile device, a desktop computer, a laptop, a computer work-station, a computing device, a mainframe machine, a server, such as a cloud server, and a group of servers. Although in FIG. 1, the user-end device 106 is separated from the electronic device 102; however, in some embodiments, the user-end device 106 may be integrated in the electronic device 102, without a deviation from the scope of the disclosure.

The GAN model 108 may include a first neural network model (referred as a generator model) and a second neural network model (referred as a discriminator model). The goal of the generator model may be to output a random variable that may emulate a target distribution. The goal of the discriminator model may be to classify an input random variable into a first category that may indicate that the input random variable may belong to the target distribution and classify into a second category that may indicate that the input random variable may not belong to the target distribution. The output of the generator model may be fed as the input of the discriminator model in the GAN model 108. To train the GAN model 108, a pre-trained discriminator model may be used and the generator model may be progressively trained such that the generator model may be able to influence a discrimination-ability of the discriminator model. In other words, when trained, the generator model may be able to generate a random variable which may be so close to the target distribution that the discriminator model may not be able to accurately classify the generated random variable as a true target distribution value or a value from the generator model.

Each neural network model (such as, the generator model, the discriminator model, and the neural network model 110) may be a computational network or a system of artificial neurons, arranged in a plurality of layers, as nodes. The plurality of layers of each neural network model may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network model. Node(s) in the final layer may receive inputs from at least one hidden layer to output a result. The number of layers and the number of nodes in each layer may be determined from hyper-parameters of the neural network model. Such hyper-parameters may be set before or while training the neural network model on a training dataset (for example, the image dataset 114).

Each node of the neural network model may correspond to a mathematical function (e.g., a sigmoid function or a rectified linear unit) with a set of parameters, tunable during training of the neural network model. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a different mathematical function.

In training of the neural network model, one or more parameters of each node of the neural network model may be updated based on whether an output of the final layer for a given input (from the training dataset, such as, the image dataset 114) matches a correct result based on a loss function for the neural network model. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like.

Figure 2:
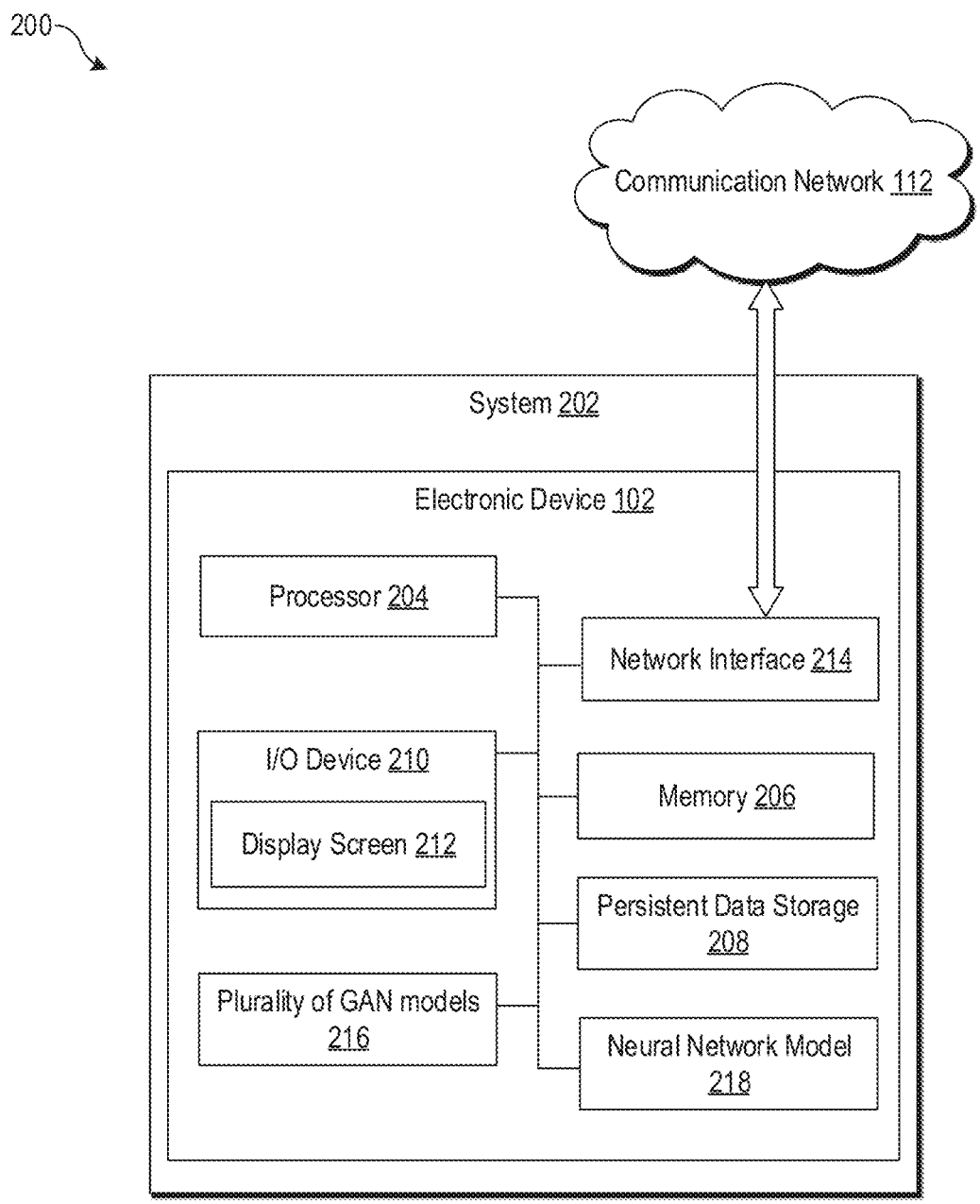
FIG. 2 is a block diagram that illustrates an exemplary electronic device for interpretability analysis of an image generated by a Generative Adversarial Network (GAN) model.

Each neural network model may include electronic data, such as, for example, a software program, code of the software program, libraries, applications, scripts, or other logic or instructions for execution by a processing device (such as a processor 204 of the electronic device 102 of FIG. 2). Each neural network model may include code and routines configured to enable a computing device including the processor to perform one or more tasks such as, emulation of a target distribution (for the generator model), classification of input data (for the discriminator model), or determination of saliency maps (for the neural network model 110). Additionally, or alternatively, the neural network model may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model may be implemented using a combination of hardware and software.

Examples of the neural network model (such as, the generator model, the discriminator model, and the neural network model 110) may include, but are not limited to, a deep neural network (DNN), a convolutional neural network (CNN), an artificial neural network (ANN), a fully connected neural network, a deep Bayesian neural network, and/or a combination of such networks. In some embodiments, the neural network model may include numerical computation techniques using data flow graphs. In certain embodiments, the neural network model may be based on a hybrid architecture of multiple Deep Neural Networks (DNNs). In some embodiments, the neural network model 110 may be a Dilated Convolution Neural Network model. The neural network model 110 may be associated with an Attentive model that may correspond to an Attentive Convolutional Long Short-Term Memory Network (LSTM) model.

The communication network 112 may include a communication medium through which the electronic device 102 may communicate with the servers which may store the database 104, and the user-end device 106. Examples of the communication network 112 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 104 and the user-end device 106. In addition, in some embodiments, the functionality of each of the database 104 and the user-end device 106 may be incorporated into the electronic device 102, without a deviation from the scope of the disclosure.

FIG. 2 is a block diagram that illustrates an exemplary electronic device for interpretability analysis of an image generated by a Generative Adversarial Network (GAN) model, arranged in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, a persistent data storage 208, an input/output (I/O) device 210, a display screen 212, a network interface 214, a plurality of GAN models 216, and a neural network model 218.

The processor 204 may include suitable logic, circuitry, and/or interfaces that may be configured to execute program instructions associated with different operations to be executed by the electronic device 102. For example, some of the operations may include reception of the image dataset 114, training the GAN model 108, generation of the set of images, determination of the first saliency map and the second saliency map, determination of the first interpretability coefficient, determination of the first typicality score, determination of the second typicality score, determination of the second interpretability coefficient, determination of the interpretability score, and control to render the interpretability score. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a Graphics Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 206 may include suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may include suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store the image dataset 114 received from the database 104, the generated set of images, the first saliency map, the second saliency map, the first interpretability coefficient, the first typicality score, the second typicality score, the second interpretability coefficient, and the interpretability score. Either of the memory 206, the persistent data storage 208, or combination may further store the plurality of GAN models 216 (including the GAN model 108) and the neural network model 218 (for example, the neural network model 110).

The I/O device 210 may include suitable logic, circuitry, interfaces, and/or code that may be configured to receive a user input. For example, the I/O device 210 may receive a user input to retrieve the image dataset 114. In another example, the I/O device 210 may receive a user input to generate the image dataset 114, or to edit one or more images in an existing dataset including the image dataset 114, and/or store the generated/edited image dataset 114. The I/O device 210 may further receive a user input that may include an instruction to determine the interpretability score associated with the GAN model 108 that may be trained based on the image dataset 114. The I/O device 210 may be further configured to provide an output in response to the user input. For example, the I/O device 210 may render the interpretability score (as may be determined by the electronic device 102) on the display screen 212. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display (e.g., the display screen 212) and a speaker.

The display screen 212 may comprise suitable logic, circuitry, interfaces, and/or code that may be configured to display the interpretability score associated with the GAN model 108. The display screen 212 may be configured to receive the user input from the user 116. In such cases the display screen 212 may be a touch screen to receive the user input. The display screen 212 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 214 may comprise suitable logic, circuitry, interfaces, and/or code that may be configured to establish a communication between the electronic device 102, the database 104, and the user-end device 106, via the communication network 112. The network interface 214 may be implemented by use of various known technologies to support wired or wireless communication of the electronic device 102, via the communication network 112. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
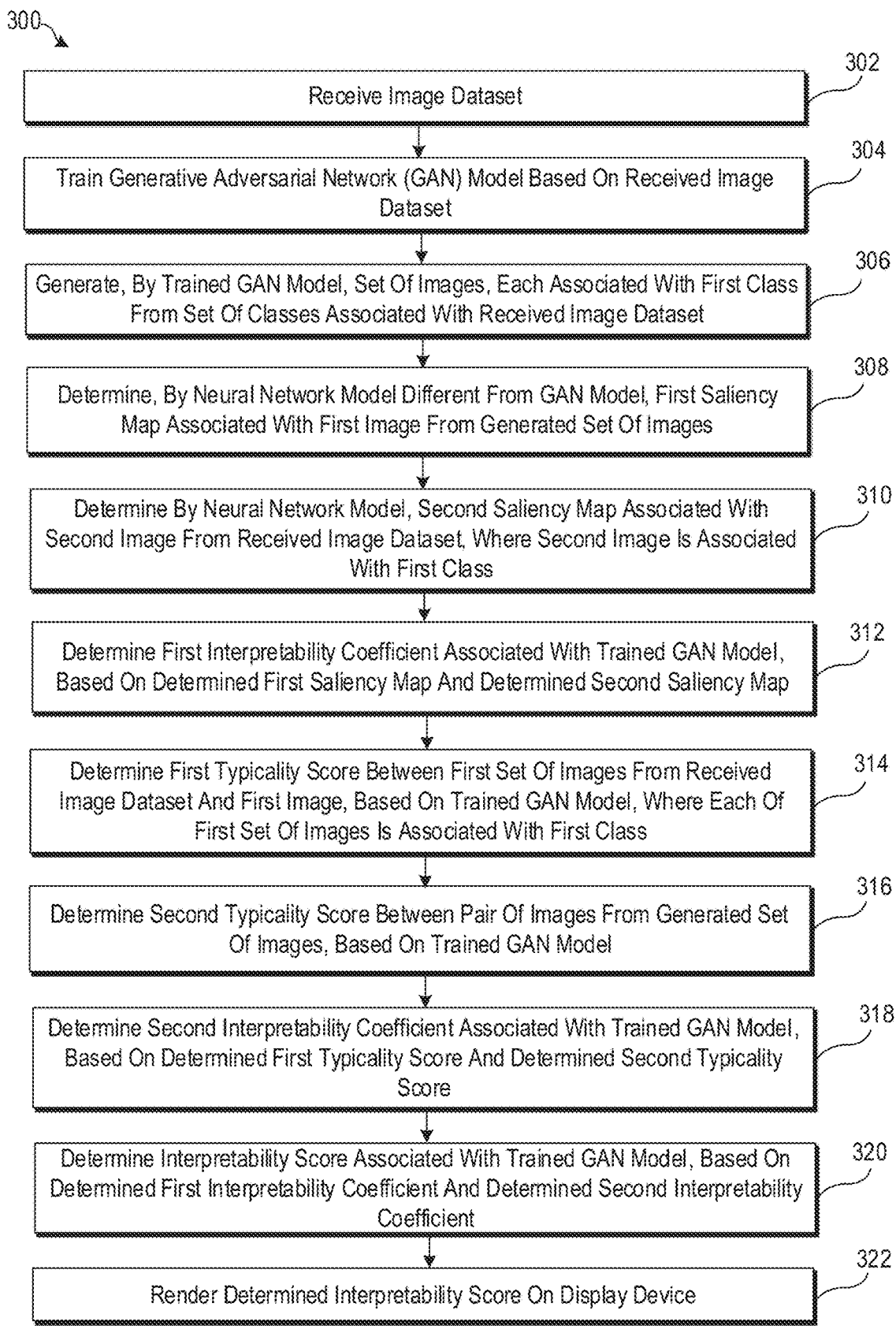
FIG. 3 is a diagram that illustrates a flowchart of an example method for interpretability analysis of an image generated by a Generative Adversarial Network (GAN) model.

FIG. 3 is a diagram that illustrates a flowchart of an example method for interpretability analysis of an image generated by a Generative Adversarial Network (GAN) model, in accordance with an embodiment of the disclosure. FIG. 3 is described in conjunction with elements from FIG. 1, and FIG. 2. With reference to FIG. 3, there is shown a flowchart 300. The method illustrated in the flowchart 300 may start at 302 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 300 may be divided into additional blocks, combined into fewer blocks, or eliminated, depending on the particular implementation.

At block 302, the image dataset 114 may be received. In an embodiment, the processor 204 may be configured to receive the image dataset 114. The processor 204 may be configured to extract the image dataset 114 from the database 104 and store the extracted image dataset 114 in the memory 206 and/or the persistent data storage 208. Alternatively, the processor 204 may acquire the image dataset 114 based on user input, from the user 116.

At block 304, the GAN model 108 may be trained based on the received image dataset 114. In an embodiment, the processor 204 may be configured to train the GAN model 108 based on the received image dataset 114. The GAN model 108 may include the generator model (i.e., the first neural network model) and the discriminator model (i.e., the second neural network model). The discriminator model may be a pre-trained neural network model that may be configured to classify an input image generated by the generator model. The input image may be categorized in either a first category or a second category. The first category may indicate that the input image may be a generated image. The second category may indicate that the input image may belong to a target distribution of the generator model. The generator model may be trained based on the received image dataset 114 such that the generator model may generate images that may be closer to images belonging to the target distribution of the generator model. The training of the generator model (and hence the GAN model 108) may continue till the generator model may be able to generate images that may be categorized by the discriminator model in one of the first category or the second category with a 50% probability (or a 50±a % probability, where "a" may be a small valued threshold).

At block 306, a set of images may be generated by the trained GAN model 108. Each of the generated set of images may be associated with a first class from a set of classes associated with the received image dataset 114. Examples of the set of classes may include, but are not limited to, an animal face class, a human face class, a food class, or a wearable class (like a footwear class). In an embodiment, the processor 204 may be configured to control the trained GAN model 108 to generate the set of images.

At block 308, a first saliency map associated with a first image, from the generated set of images, may be determined by the neural network model 110. The neural network model 110 may be different from the GAN model 108. In an embodiment, the processor 204 may be configured to control the neural network model 110 to determine the first saliency map associated with the first image from the generated set of images. The determination of the first saliency map is described further, for example, in FIGS. 4 and 6.

At block 310, a second saliency map associated with a second image, from the received image dataset 114, may be determined by the neural network model 110. The second image may be associated with the first class. In an embodiment, the processor 204 may be configured to control the neural network model 110 to determine the second saliency map associated with the second image from the received image dataset 114. In an embodiment, the second image from the received image dataset 114 may correspond to an average image associated with the first class. The average image of the first class may correspond to an image whose feature vector corresponds to an average feature vector of each image of the first class, from the received image dataset 114. Thus, the second image may be such an image from the received image dataset 114 whose feature vector may be an average feature vector of each image of the first class, in the received image dataset 114. The determination of the second saliency map may be similar to the determination of the first saliency map, as described, for example, in FIGS. 4 and 6.

At block 312, a first interpretability coefficient associated with the trained GAN model 108 may be determined, based on the determined first saliency map and the determined second saliency map. In an embodiment, the processor 204 may be configured to determine the first interpretability coefficient associated with the trained GAN model 108, based on the determined first saliency map and the determined second saliency map. The determination of the first interpretability coefficient is described further, for example, in FIG. 5.

At block 314, a first typicality score between a first set of images from the received image dataset 114 and the first image may be determined, based on the trained GAN model 108. Herein, each of the first set of images may be associated with the first class. In an embodiment, the processor 204 may be configured to determine the first typicality score between the first set of images from the received image dataset 114 and the first image, based on the trained GAN model 108. The determination of the first typicality score is described further, for example, in FIG. 7.

At block 316, a second typicality score between a pair of images from the generated set of images may be determined, based on the trained GAN model 108. In an embodiment, the processor 204 may be configured to determine the second typicality score between the pair of images from the generated set of images, based on the trained GAN model 108. The determination of the second typicality score is described further, for example, in FIG. 8.

At block 318, a second interpretability coefficient associated with the trained GAN model 108 may be determined, based on the determined first typicality score and the determined second typicality score. In an embodiment, the processor 204 may be configured to determine the second interpretability coefficient associated with the trained GAN model 108, based on the determined first typicality score and the determined second typicality score. The determination of the second interpretability coefficient is described further, for example, in FIG. 10.

At block 320, an interpretability score associated with the trained GAN model 108 may be determined, based on the determined first interpretability coefficient and the determined second interpretability coefficient. In an embodiment, the processor 204 may be configured to determine the interpretability score associated with the trained GAN model 108, based on the determined first interpretability coefficient and the determined second interpretability coefficient. In an embodiment, the processor 204 may determine the interpretability score as a weighted combination of the determined first interpretability coefficient and the determined second interpretability coefficient. In such case, the interpretability score may be determined, using equation (1) as follows:

$$\text{Interpretability score} = w_1 \cdot IC_1 + w_2 \cdot IC_2 \qquad (1)$$

where,
$IC_1$ may represent the first interpretability coefficient;
$IC_2$ may represent the second interpretability coefficient;
$w_1$ may represent a first weight associated with the first interpretability coefficient; and
$w_2$ may represent a first weight associated with the second interpretability coefficient.

The weight of each of the first interpretability coefficient and the second interpretability coefficient may vary, based on an application area in which the GAN model 108 may be used. In an example, each of the first interpretability coefficient and the second interpretability coefficient may be assigned an equal weight, i.e., a weight of ½. An example of the determination of the interpretability score is described further, for example, in FIGS. 11A, 11B, 12A, and 12B.

At block 322, the determined interpretability score may be rendered on a display device. In an embodiment, the processor 204 may be configured to control a display device to render the determined interpretability score associated with the trained GAN model 108. For example, the processor 204 may display the determined interpretability score on the display screen 212 of the electronic device 102. Alternatively, the processor 204 may transmit the determined interpretability score to the user-end device 106 and may control the user-end device 106 to render the transmitted interpretability score on a display screen of the user-end device 106. Control may pass to end.

Although the flowchart 300 is illustrated as discrete operations, such as 302, 304, 306, 308, 310, 312, 314, 316, 318, 320, and 322. However, in certain embodiments, such discrete operations may be further divided into additional operations, combined into fewer operations, or eliminated, depending on the particular implementation without detracting from the essence of the disclosed embodiments.

Figure 4:
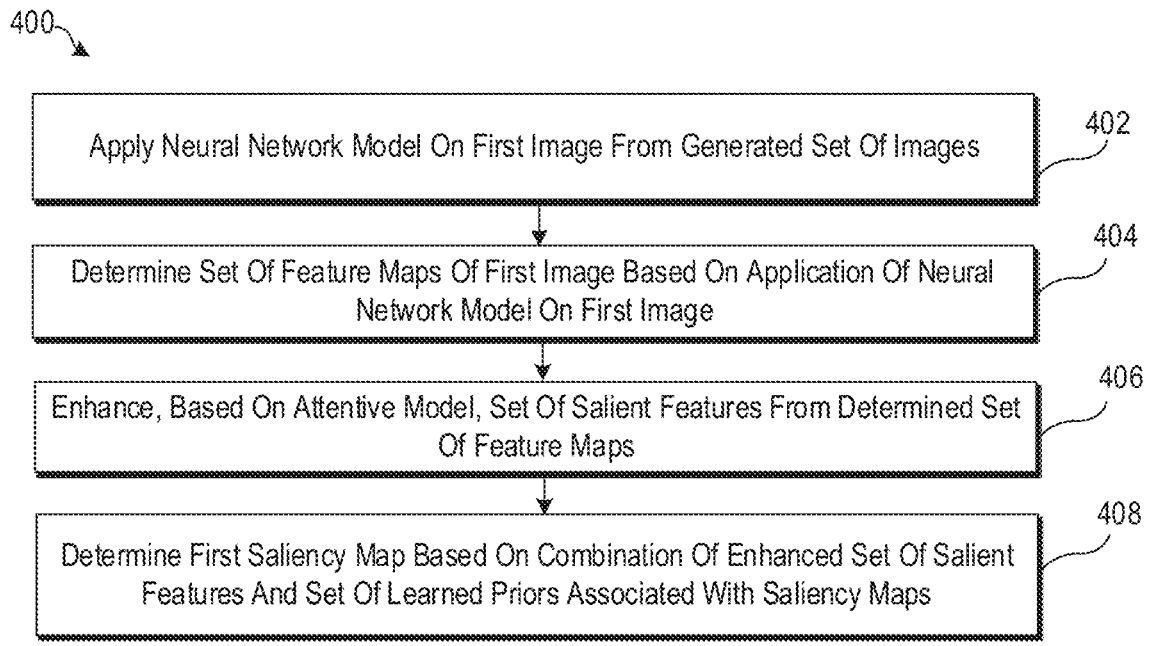
FIG. 4 is a diagram that illustrates a flowchart of an example method for determination of a first saliency map associated with a first image from a set of images generated by a Generative Adversarial Network (GAN) model.

FIG. 4 is a diagram that illustrates a flowchart of an example method for determination of a first saliency map associated with a first image from a set of images generated by a Generative Adversarial Network (GAN) model, in accordance with an embodiment of the disclosure. FIG. 4 is described in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, the neural network model 110 may be applied on the first image from the generated set of images. In an embodiment, the processor 204 may be configured to apply the neural network model 110 on the first image from the generated set of images. In an embodiment, the neural network model 110 may correspond to a Dilated Convolution Neural Network model or a deep neural network model. To apply the neural network model 110 on the first image, the first image may be fed as an input to an input layer of the neural network model 110. An example of the Dilated Convolution Neural Network model is described further, for example, in FIG. 6.

At block 404, a set of feature maps of the first image may be determined, based on the application of the neural network model 110 on the first image. In an embodiment, the processor 204 may be configured to determine the set of feature maps of the first image, based on the application of the neural network model 110 on the first image. Based on the application of the neural network model 110 on the inputted first image, various nodes at each layer of the neural network model 110 may determine a set of features associated with the first image. The set of features determined at a previous layer may be fed as input to a next layer of the neural network model 110, until a final set of features may be obtained at a layer before a penultimate layer (i.e., a layer before a soft-max layer) of the neural network model 110. The final set of features of the first image may correspond to the set of feature maps of the first image.

At block 406, a set of salient features may be enhanced from the determined set of feature maps based on an Attentive model. In an embodiment, the processor 204 may be configured to enhance, based on the Attentive model, the set of salient features from the determined set of feature maps. In an embodiment, the Attentive model may correspond to an Attentive Convolutional Long Short-Term Memory Network (LSTM) model. An example of the Attentive Convolutional LSTM model and the enhancement of the set of salient features is described further, for example, in FIG. 6.

At block 408, the first saliency map associate with the first image may be determined, based on a combination of the enhanced set of salient features and a set of learned priors associated with saliency maps. In an embodiment, the processor 204 may be configured to determine the first saliency map associated with the first image, based on the combination of the enhanced set of salient features and the set of learned priors associated with saliency maps. An example of the set of learned priors and the determination of the first saliency map is described further, for example, in FIG. 6. The second saliency map associated with the second image from the received image dataset 114 may be determined in a manner similar to determination of the first saliency map, as described herein and also, for example, in FIG. 6. Control may pass to end.

Although the flowchart 400 is illustrated as discrete operations, such as 402, 404, 406, and 408. However, in certain embodiments, such discrete operations may be further divided into additional operations, combined into fewer operations, or eliminated, depending on the particular implementation without detracting from the essence of the disclosed embodiments.

Figure 5:
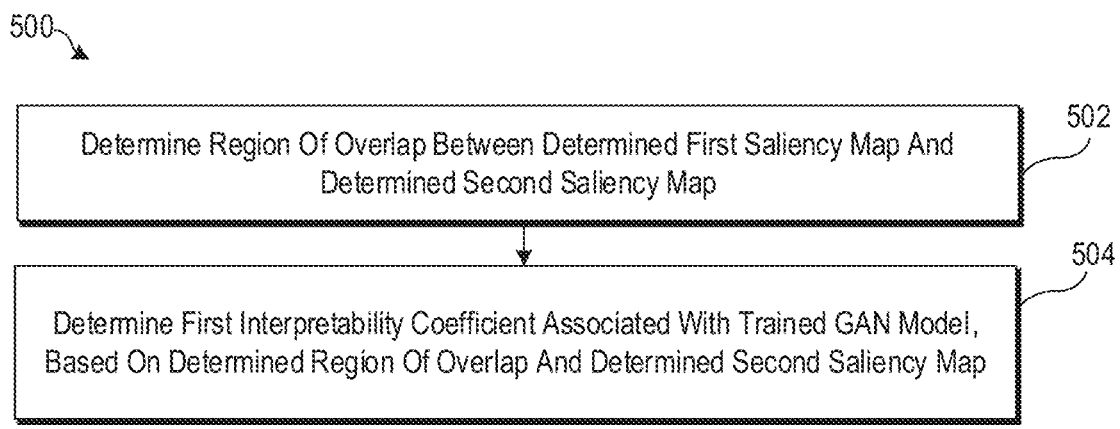
FIG. 5 is a diagram that illustrates a flowchart of an example method for determination of a first interpretability coefficient associated with the trained a Generative Adversarial Network (GAN) model.

FIG. 5 is a diagram that illustrates a flowchart of an example method for determination of a first interpretability coefficient associated with the trained Generative Adversarial Network (GAN) model, in accordance with an embodiment of the disclosure. FIG. 5 is described in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, a region of overlap between the determined first saliency map and the determined second saliency map may be determined. In an embodiment, the processor 204 may be configured to determine the region of overlap between the determined first saliency map and the determined second saliency map. To determine the region of overlap, each pixel of the first saliency map may be compared with a corresponding pixel of the second saliency map. Based on the comparison, a set of pixel positions of pixels in the first saliency map and corresponding pixels in the second saliency map with same pixel values (or similar pixel values) may be determined. In an embodiment, the corresponding pixel values may be considered as similar if a difference between the corresponding pixel values may be less than a threshold value (such as, a small number, for example, 5 or 10). The determined set of pixel positions may correspond to the region of overlap between the first saliency map and the second saliency map.

At block 504, the first interpretability coefficient associated with the trained GAN model 108 may be determined, based on the determined region of overlap and the determined second saliency map. In an embodiment, the processor 204 may be configured to determine the first interpretability coefficient associated with the trained GAN model 108, based on the determined region of overlap and the determined saliency map. In an embodiment, the processor 204 may use equation (2), as follows, to determine the first interpretability coefficient:

$$IC_1 = \frac{(SM_1 \cap SM_2)}{SM_2} \quad (2)$$

where,
$IC_1$ may represent the first interpretability coefficient;
$\cap$ may represent an overlap operator;
$SM_1$ may represent the first saliency map; and
$SM_2$ may represent the second saliency map.

Thus, the first interpretability coefficient may correspond to a ratio of the region of overlap between the first saliency map and the second saliency map, with respect to the second saliency map. Control may pass to end.

Although the flowchart 500 is illustrated as discrete operations, such as 502 and 504. However, in certain embodiments, such discrete operations may be further divided into additional operations, combined into fewer operations, or eliminated, depending on the particular implementation without detracting from the essence of the disclosed embodiments.

Figure 6:
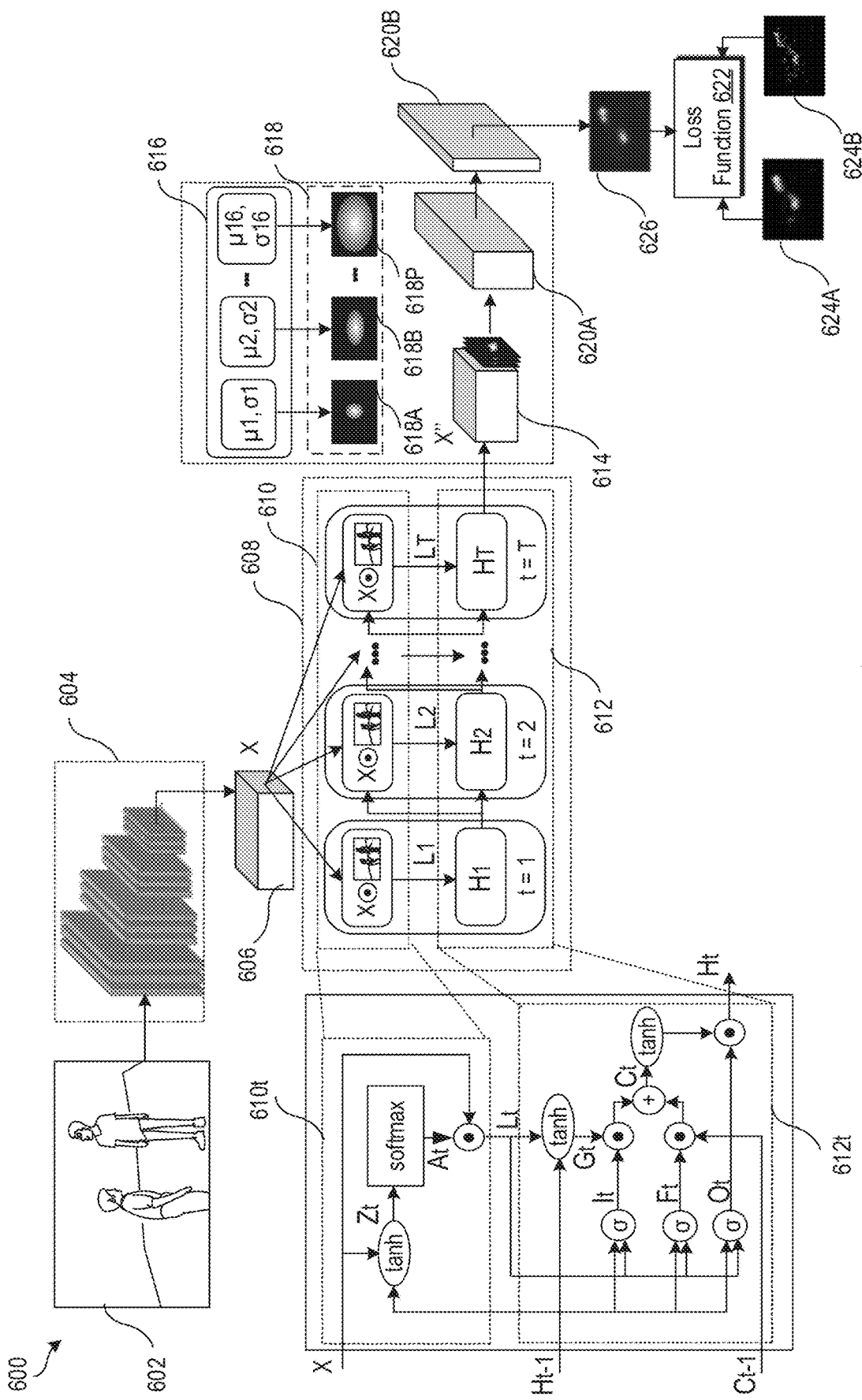
FIG. 6 is a diagram that illustrates an example scenario of a neural network model for determination of saliency map of an input image.

FIG. 6 is a diagram that illustrates an example scenario of a neural network model for determination of saliency map of an input image, arranged in accordance with at least one embodiment described in the present disclosure. FIG. 6 is explained in conjunction with elements from FIG. 1, FIG. 2, FIG. 3, FIG. 4, and FIG. 5. With reference to FIG. 6, there is shown an example scenario 600. The scenario 600 includes an input image 602, a Dilated Convolution Network 604, a set of feature maps 606, an Attentive Convolutional Long Short-Term Memory network (LSTM) model 608 including an Attentive model 610 and a Convolutional LSTM model 612. The scenario 600 may further include an enhanced set of salient features 614. The scenario 600 may further include a set of learned priors 618 (such as, learned priors 618A, 618B, . . . and 618P) associated with saliency maps. The set of learned priors 618 may be associated with a set of Gaussian parameters 616. The scenario 600 may further include a penultimate convolution layer 620A and a final convolution layer 620B associated with a neural network model (for e.g., the neural network model 110). The scenario 600 may further include an output saliency map 626, a loss function 622, a ground truth density map 624A and a ground truth fixation map 624B.

The Dilated Convolution Network 604 may correspond to a convolutional neural network model with at least one layer having stride (that may be denoted by "s") greater than 1, such that output resolution of the Dilated Convolution Network 604 may be increased based on a reduction of the stride of the particular layer, and an addition of a dilation to all layers that may follow the particular layer. The processor 204 may be configured to feed the input image 602 (for example, the first image) to an input layer of the Dilated Convolution Network 604 (for example, the neural network model 110). The Dilated Convolution Network 604 may be applied on the input image 602 fed to the input layer. Based on the application of the Dilated Convolution Network 604 on the input image 602, various nodes at each layer of the Dilated Convolution Network 604 may determine a set of features associated with the input image 602. The set of features determined at a previous layer may be fed as input to a next layer of the Dilated Convolution Network 604, until a final set of features may be obtained at a layer before a penultimate layer (i.e., a layer before a soft-max layer) of the Dilated Convolution Network 604. The final set of features of the input image 602 may correspond to the set of feature maps 606 (which may be denoted by "X") of the input image 602.

The processor 204 may feed the set of feature maps 606 (denoted by "X") to the Attentive Convolutional LSTM model 608, which may output an enhanced set of salient features 614 (which may be denoted by X") associated with the input image 602. As shown in FIG. 6, the Attentive Convolutional LSTM model 608 may include a set of stages (or iterations) of the Attentive model 610 associated with a set of stages (or iterations) of the Convolutional LSTM model 612. The Attentive Convolutional LSTM model 608 may work based on a sequential update of an internal state of the set of feature maps 606 based on values of three sigmoidal gates at each stage. For example, in FIG. 6, there is shown an exemplary pair of an Attentive Model 610*t* and a Convolutional LSTM model 612*t* at a t$^{th}$-stage of the Attentive Convolutional LSTM model 608. The processor 204 may update of the states of set of feature maps 606 at the t$^{th}$-stage of the Attentive Convolutional LSTM model 608, based on following equations:

$$I_t = \sigma(W_i * \tilde{X}_t + U_i * H_{t-1} + b_i) \quad (3)$$

$$F_t = \sigma(W_f * \tilde{X}_t + U_f * H_{t-1} + b_f) \quad (4)$$

$$O_t = \tanh(W_c * \tilde{X}_t + U_c * H_{t-1} + b_c) \quad (5)$$

$$G_t = \sigma(W_i * \tilde{X}_t + U_i * H_{t-1} + b_i) \quad (6)$$

$$C_t = F_t \odot C_{t-1} + I_t \odot G_t \quad (7)$$

$$H_t = O_t \odot \tanh(C_t) \quad (8)$$

where, $I_t$, $F_t$, and $O_t$ may represent sigmoidal gates;
$G_t$ may represent a candidate memory $G_t$;
$C_t$ and $C_{t-1}$ may represent memory cells;
$H_t$ and $H_{t-1}$ may represent hidden states;
"*" may represent the convolutional operator;
Each W and U term may represent a 2D convolutional kernel; and Each b term may represent a learned bias.

Each of the sigmoidal gates, the candidate memory, the memory cells, and the hidden states may correspond to 3D tensors, each having 512 channels. At each stage (or iteration), for e.g., the t$^{th}$-stage, an input (e.g., $\tilde{X}_t$) of an LSTM layer (e.g., the Convolutional LSTM model 612*t*) may be computed based on an Attentive mechanism (e.g., the Attentive model 610*t*). The processor 204 may use following equations to determine the input of the LSTM layer (i.e., the Convolutional LSTM model 612*t*) at the t$^{th}$-stage, based on the Attentive model 610*t*:

$$Z_t = V_a^* \tanh(W_a^* X + U_a^* H_{t-1} + b_a) \quad (9)$$

$$A_t^{ij} = p(att_{ij} \mid X, H_{t-1}) = \frac{\exp(Z_t^{ij})}{\sum_i \sum_j \exp(Z_t^{ij})} \quad (10)$$

$$\tilde{X}_t = A_t \odot X \quad (11)$$

With reference to the equation (9), an attention map may be generated based on a convolution of a previous hidden state (e.g., $H_{t-1}$) and the input (e.g., X). The result, so obtained, may be fed to an activation function (e.g., a tanh function) and thereafter convolved with a single channel convolution kernel (e.g., $V_a$). With reference to the equation (10), a normalized spatial attention map may be determined based on a softmax operator. Herein, $A_t^i$ may represent an element of the attention map (e.g., "att") at the position (i, j) and exp( ) may represent an exponential function. With reference to the equation (11), the input (i.e.,$\tilde{X}_t$) for the Convolutional LSTM model 612*t* may be generated based on an application of the attention map to the input X (i.e., the set of feature maps 606) based on an element-wise product between each channel of the feature maps and the attention map.

The processor 204 may be configured to determine a saliency map (e.g., the first saliency map) associated with the input image 602 (e.g., the first image) based on a combination of the enhanced set of salient features 614 (e.g., X") and the set of learned priors 618 associated with saliency maps. A center bias associated with the set of learned priors 618 may be modeled based on the set of Gaussian parameters 616 using a diagonal covariance matrix. The processor 204 may learn, by the Dilated Convolution Network 604 (for example, the neural network model 110), a mean and a covariance associated with each of the set of learned priors 618 based on following equation:

$$f(x, y) = \frac{1}{2\pi\sigma_x\sigma_y} \exp\left(-\left(\frac{(x-\mu_x)^2}{2\sigma_x^2} + \frac{(y-\mu_y)^2}{2\sigma_y^2}\right)\right) \quad (12)$$

Where, $\sigma_x$ and $\sigma_y$ may represent x and y direction covariances, respectively; and
$\mu_x$ and $\mu_y$ may represent x and y direction means, respectively.

Thus, the Dilated Convolution Network 604 may learn parameters from the set of Gaussian parameters 616 and generate associated prior maps based on the set of learned priors 618. In an embodiment, the set of Gaussian parameters 616 may include 16 parameters and the set of learned priors 618 may also include 16 learned priors. A tensor associated with the enhanced set of salient features 614 (e.g., X") may include 512 channels. The processor 204 may concatenate the 512 channels of the enhanced set of salient features 614 with the 16 learned priors in the set of learned prior 618 to obtain 528 channels. The processor 204 may then feed the resultant tensor to the penultimate convolution layer 620A. Each of the penultimate convolution layer 620A and the final convolution layer 620B may also be dilated convolution layers. The penultimate convolution layer 620A may have 512 filters. The processor 204 may feed an output of the penultimate convolution layer 620A to the final convolution layer 620B with one filter and a kernel size of "1". The final convolution layer 620B may extract a final convolution map, such as, the output saliency map 626 (e.g., the first saliency map).

In a training phase of the Dilated Convolution Network 604 and the Attentive Convolutional LSTM model 608, the predicted output saliency map 626 may be fed to a loss function 622, which may provide a feedback on a quality of the prediction based on the ground truth density map 624A and the ground truth fixation map 624B. The loss function 622 may be determined by use of following equations:

$$L(\hat{y}, y^{den}, y^{fix}) = \alpha L_1(\hat{y}, y^{fix}) + \beta L_2(\hat{y}, y^{den}) + \gamma L_3(\hat{y}, y^{fix}) \quad (13)$$

$$L_1(\hat{y}, y^{fix}) = \frac{1}{N} \sum_i \frac{\hat{y}_i - \mu(\hat{y})}{\sigma(\hat{y})} \cdot y_i^{fix} \quad (14)$$

$$L_2(\hat{y}, y^{den}) = \frac{\sigma(\hat{y}, y^{den})}{\sigma(\hat{y}).\sigma(\hat{y}^{den})} \quad (15)$$

$$L_3(\hat{y}, y^{den}) = \sum_i y_i^{den} \cdot \log\left(\frac{y_i^{den}}{y_i^{den} + \epsilon} + \epsilon\right) \quad (16)$$

where,
- ỹ may represent a predicted saliency map (e.g., the output saliency map 626);
- $y^{den}$ may represent the ground truth density map 624A;
- $y^{fix}$ may represent the ground truth fixation map 624B;
- $L_1$ may represent a loss function corresponding to a Normalized Scanpath Saliency;
- $L_2$ may represent a loss function corresponding to a Linear Correlation Coefficient;
- $L_3$ may represent a loss function corresponding to a Kullback-Leibler Divergence; and
- $\alpha$, $\beta$, and $\gamma$ may represent three scalars that may balance the loss functions $L_1$, $L_2$, and $L_3$ It may be noted that the scenario 600 shown in FIG. 6 is presented merely as example and should not be construed to limit the scope of the disclosure.

Figure 7:
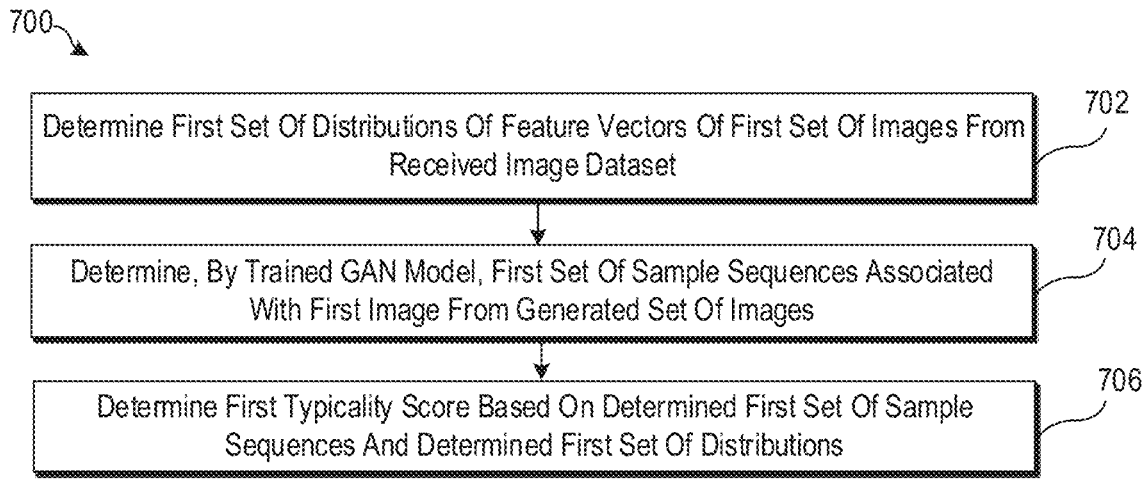
FIG. 7 is a diagram that illustrates a flowchart of an example method for determination of a first typicality score between a first set of images from a received image dataset and a first image from a set of images generated by a Generative Adversarial Network (GAN) model.

FIG. 7 is a diagram that illustrates a flowchart of an example method for determination of a first typicality score between a first set of images from a received image dataset and a first image from a set of images generated by a Generative Adversarial Network (GAN) model, in accordance with an embodiment of the disclosure. FIG. 7 is described in conjunction with elements from FIG. 1, FIG. 2, FIG. 3, FIG. 4, FIG. 5, and FIG. 6. With reference to FIG. 7, there is shown a flowchart 700. The method illustrated in the flowchart 700 may start at 702 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, a first set of distributions of feature vectors of a first set of images from the received image dataset 114 may be determined. In an embodiment, the processor 204 may be configured to determine the first set of distributions of feature vectors of the first set of images from the received image dataset 114. Herein, each of the first set of images may be associated with the first class. The first class may also be associated with the first image from the set of images generated by the GAN model 108. As an example, consider $F^i(k)$ as a feature vector for a $k^{th}$ sample image from the first set of images that may belong to the first class (for example, a class, $c_i$). The feature vector (i.e., $F^i(k)$) may have a dimension of $N_f$, wherein $N_f$ may correspond to a number of features that may be used in a classification of the received image dataset 114. Herein, raw pixel intensities may be considered for the classification of images in the received image dataset 114. The feature vector for a sample image may be determined based on an application of the GAN model 108 on the sample image. The processor 204 may use the first set of images as a training dataset associated with the first class to obtain a set of distributions (i.e., the first set of distributions) of feature vectors by use of a softmax function. The first set of distributions may be obtained by use of following equation:

$$P_{F_i|c_i}(f_i \mid c_i) = \frac{\exp(F_l^i)}{\sum_{m=1}^{N_f} \exp(F_m^i)} \quad (17)$$

where,
$F^i l$ may represent the $l^{th}$ element of $F^i$.

At block 704, a first set of sample sequences associated with the first image from the generated set of images may be determined by the trained GAN model 108. In an embodiment, the processor 204 may be configured to determine, by the trained GAN model 108, the first set of sample sequences associated with the first image from the set of images generated by the GAN model 108. In an embodiment, the processor 204 may determine a test feature vector (e.g., $f_t$) for the first image by an application of the GAN model 108 on the first image. The processor 204 may then generate a sequence of length "Q" associated with the first image by sampling with replacement from the first set of distributions (given by equation (17)). Further, the processor 204 may compute $-\log_2 P_F(f_t\backslash c_i)$, based on equation (17).

At block 706, the first typicality score may be determined based on the determined first set of sample sequences and the determined first set of distributions. In an embodiment, the processor 204 may be configured to determine the first typicality score based on the determined first set of sample sequences and the determined first set of distributions. To determine the first typicality score, the processor 204 may determine an atypicality score based on a deviation of the determined first set of sample sequences from the determined first set of distributions. The processor 204 may compute the deviation (e.g., $D_f$) from the determined first set of distributions by use of following equation:

$$D_f = -QH(F|C) - \log_2 P_F(f_t|c_i) \quad (18)$$

where,
$H(F|C) = E[-\log_2 P_{xn}(x^n)]$ (considering weak typicality and weak law of large numbers);
$H(F|C)$ may correspond to an entropy value of the first set of distributions; and
"E" may represent an expectation value.

Herein, "x" may represent a feature vector of a sample image from the first set of images (i.e., the training dataset associated with the first class). The feature vector (i.e., "x") may be drawn from the first set of distributions (given by equation (17)). In an embodiment, each of the first set of distributions may correspond to an independent and identically distributed distribution. Also, herein, "$x^m$" may correspond to a sequence of the feature vectors (e.g., $x_1$, such as, $x_1, x_2, \ldots x_n$) of sample images from the first set of images. Each of the feature vectors (i.e., $x_i$) may be drawn from the first set of distributions.

The deviation (i.e., $D_f$) may correspond to the atypicality score for the first set of sample sequences associated with the first image with respect to the sequence of feature vectors of the sample images from the first set of images. The processor 204 may repeat the sampling process multiple times for both the first image and the first set of images and compute an average atypical score (e.g., an Atypicality Score$_1$) for the first image. Thereafter, the processor 204 may determine the first typicality score by use of following equation:

$$\text{First Typicality Score} = 1 - \text{Average (Atypicality Score}_1) \quad (19)$$

The determined first typicality score may be a typicality score of the first image with respect to the first set of images (i.e., the training dataset associated with the first class) from the received image dataset 114. The processor 204 may be further configured to determine a typicality score between a pair of images from the set of images generated by the GAN model 108. Such typicality score is hereinafter referred as the second typicality score. The determination of the second typicality score is described further, for example, in FIG. 8. Control may pass to end.

Although the flowchart 700 is illustrated as discrete operations, such as 702, 704, and 706. However, in certain embodiments, such discrete operations may be further divided into additional operations, combined into fewer operations, or eliminated, depending on the particular implementation without detracting from the essence of the disclosed embodiments.

Figure 8:
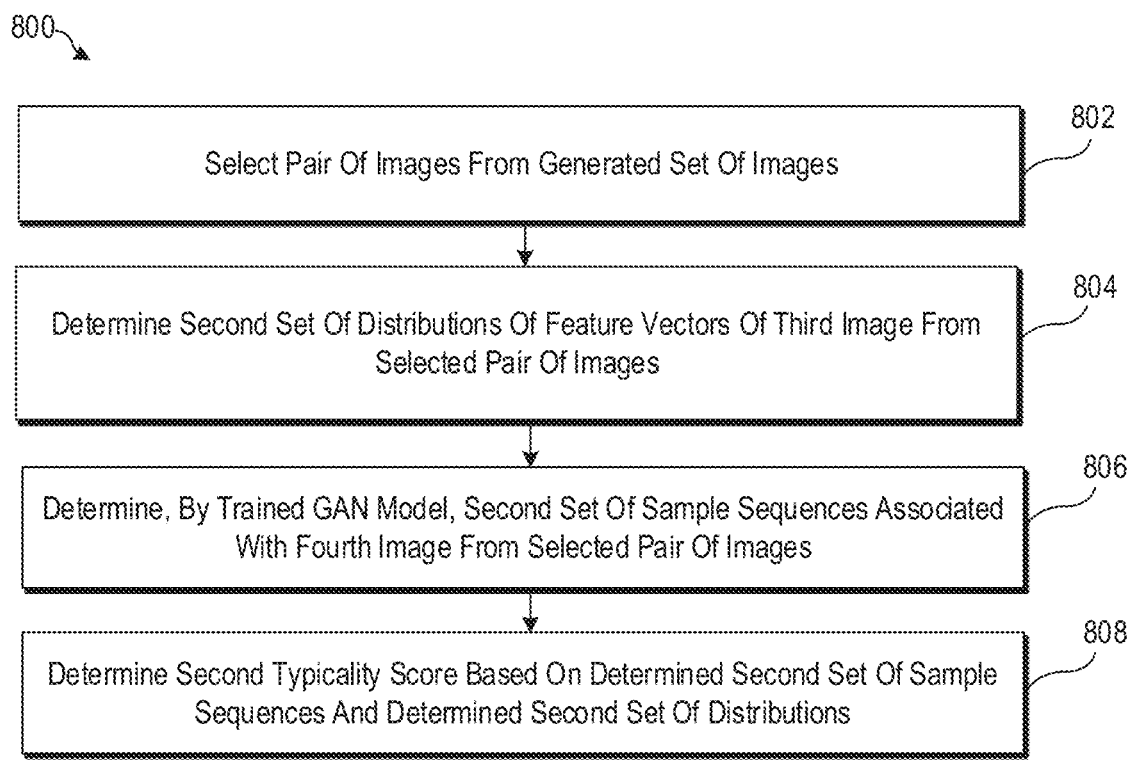
FIG. 8 is a diagram that illustrates a flowchart of an example method for determination of a second typicality score between a pair of images from a set of images generated by a Generative Adversarial Network (GAN) model.

FIG. 8 is a diagram that illustrates a flowchart of an example method for determination of a second typicality score between a pair of images from a set of images generated by a Generative Adversarial Network (GAN) model, in accordance with an embodiment of the disclosure. FIG. 8 is described in conjunction with elements from FIG. 1, FIG. 2, FIG. 3, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, a pair of images may be selected from the generated set of images. In an embodiment, the processor 204 may be configured to select the pair of images from the set of images generated by the trained GAN model 108. For example, the processor 204 may randomly select two images from the generated set of images as the pair of images. A person skilled in the art may understand that any combination of two images may be selected from the generated set of images as the pair of images, without departure from the scope of the disclosure.

At block 804, a second set of distributions of feature vectors of a third image from the selected pair of images may be determined. In an embodiment, the processor 204 may be configured to determine the second set of distributions of feature vectors of the third image from the selected pair of images. For example, the processor 204 may select any one of the selected pair of images from the generated set of images as the third image and the other of the selected pair of images as a fourth image. Thereafter, the processor 204 may determine the second set of distributions of feature vectors of a series of images (including the third image) from the generated set of images. Herein, the feature vector for an image from the series of images may be determined based on an application of the GAN model 108 on the image and raw pixel intensities may be considered for the classification of series of image. The processor 204 may use the series of images as a training dataset associated with the first class to obtain the second set of distributions of feature vectors of the third image by use of the softmax function, by use of equation (17), as described further, for example, in FIG. 7 (at block 702).

At block 806, a second set of sample sequences associated with the fourth image from the selected pair of images may be determined by the trained GAN model 108. In an embodiment, the processor 204 may be configured to determine, by the trained GAN model 108, the second set of sample sequences associated with the fourth image from the selected pair of images. In an embodiment, the processor 204 may determine a test feature vector (e.g., $f_t'$) for the fourth image by an application of the GAN model 108 on the fourth image. The processor 204 may then generate a sequence of length "Q" associated with the fourth image by sampling with replacement from the second set of distributions. Further, the processor 204 may compute $-\log_2 P_F(f_t'|C_i)$, based on equation (17).

At block 808, the second typicality score may be determined based on the determined second set of sample sequences and the determined second set of distributions. In an embodiment, the processor 204 may be configured to determine the second typicality score based on the determined second set of sample sequences and the determined second set of distributions. To determine the second typicality score, the processor 204 may determine an atypicality score based on a deviation of the determined second set of sample sequences from the determined second set of distributions. The processor 204 may compute the deviation (e.g., $D_f'$) from the determined first set of distributions by use of following equation:

$$D_f' = -QH'(F|C) - \log_2 P_F(f_t|c_i) \qquad (20)$$

where,
$H'(F|C) = E[-\log_2 P_{xn}(x^n)]$ (considering weak typicality and weak law of large numbers);
$H'(F|C)$ may correspond to an entropy value of the second set of distributions; and E may represent an expectation value.

Herein, "x" may represent a feature vector of a sample image from the series of images (i.e., the training dataset associated with the first class) from the generated set of images including the third image. The feature vector (i.e., "x") may be drawn from the second set of distributions (given by equation (17)). In an embodiment, each of the first set of distributions may correspond to an independent and identically distributed distribution. Also, herein, "xn" may correspond to a sequence of the feature vectors (e.g., $x_i$, such as, $x_1, x_2, \ldots x_n$) of sample images from the series of images from the generated set of images including the third image. Each of the feature vectors (i.e., $x_i$) may be drawn from the second set of distributions.

The deviation (i.e., $D_f'$) may correspond to an atypicality score for the second set of sample sequences associated with the fourth image with respect to the sequence of feature vectors of the series of images from the generated set of images including the third image. The processor 204 may repeat the sampling process multiple times for both the fourth image and the series of images and compute an average atypical score (e.g., an Atypicality Score₂) for the fourth image. Thereafter, the processor 204 may determine the second typicality score by use of following equation:

$$\text{Second Typicality Score} = 1 - \text{Average (Atypicality Score}_2) \qquad (21)$$

The determined second typicality score may be a typicality score of the generated fourth image with respect to other generated images or the series of images including the generated third image associated with the first class. Control may pass to end.

Although the flowchart 800 is illustrated as discrete operations, such as 802, 804, 806, and 808. However, in certain embodiments, such discrete operations may be further divided into additional operations, combined into fewer operations, or eliminated, depending on the particular implementation without detracting from the essence of the disclosed embodiments.

Figure 9:
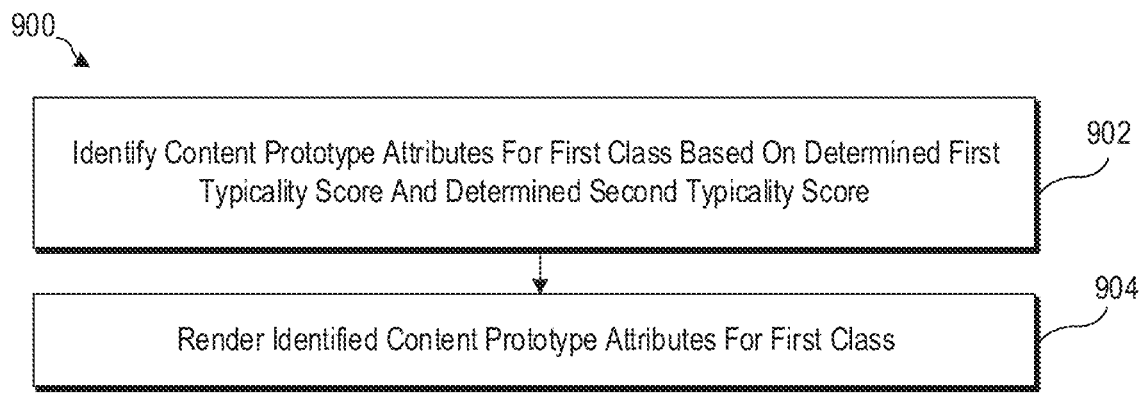
FIG. 9 is a diagram that illustrates a flowchart of an example method for identification of content prototype attributes for a first class associated with a received image dataset.

FIG. 9 is a diagram that illustrates a flowchart of an example method for identification of content prototype attributes for a first class associated with a received image dataset, in accordance with an embodiment of the disclosure. FIG. 9 is described in conjunction with elements from FIG. 1, FIG. 2, FIG. 3, FIG. 4, FIG. 5, FIG. 6, FIG. 7, and FIG. 8. With reference to FIG. 9, there is shown a flowchart 900. The method illustrated in the flowchart 900 may start at 902 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, content prototype attributes for the first class may be identified based on the determined first typicality score and the determined second typicality score. In an embodiment, the processor 204 may be configured to identify the content prototype attributes for the first class associated with the received image dataset 114 based on the determined first typicality score and the determined second typicality score. In an embodiment, the processor 204 may be configured to identify an image from the generated set of images as a prototype of the first class based on the determined first typicality score and the determined second typicality score. The identification of the image as the prototype of the first class is described further, for example, in FIG. 10. In an embodiment, the processor 204 may identify attributes of the image identified as the prototype of the first class based on at least one of, but not limited to, a segmentation technique, an object/part detection technique, or an image captioning technique. In addition, the identified attributes of the image identified as the prototype may be verified based on a user input from the user 116. The identified attributes of the image identified as the prototype (e.g., image I) may correspond to the content prototype attributes for the first class and may be represented as a(I). In an embodiment, the content prototype attributes may be used to provide explanations to human users (e.g., the user 116) for coarse-grained classification.

At block 904, the identified content prototype attributes for the first class may be rendered. In an embodiment, the processor 204 may be configured to render the identified content prototype attributes for the first class on a display device (such as the display screen 212). For example, the processor 204 may display the identified content prototype attributes for the first class on the display screen 212 of the electronic device 102. Alternatively, the processor 204 may transmit the identified content prototype attributes for the first class to the user-end device 106 and may control the user-end device 106 to render the transmitted the identified content prototype attributes for the first class on a display screen of the user-end device 106. Control may pass to end.

Although the flowchart 900 is illustrated as discrete operations, such as 902 and 904. However, in certain embodiments, such discrete operations may be further divided into additional operations, combined into fewer operations, or eliminated, depending on the particular implementation without detracting from the essence of the disclosed embodiments.

Figure 10:
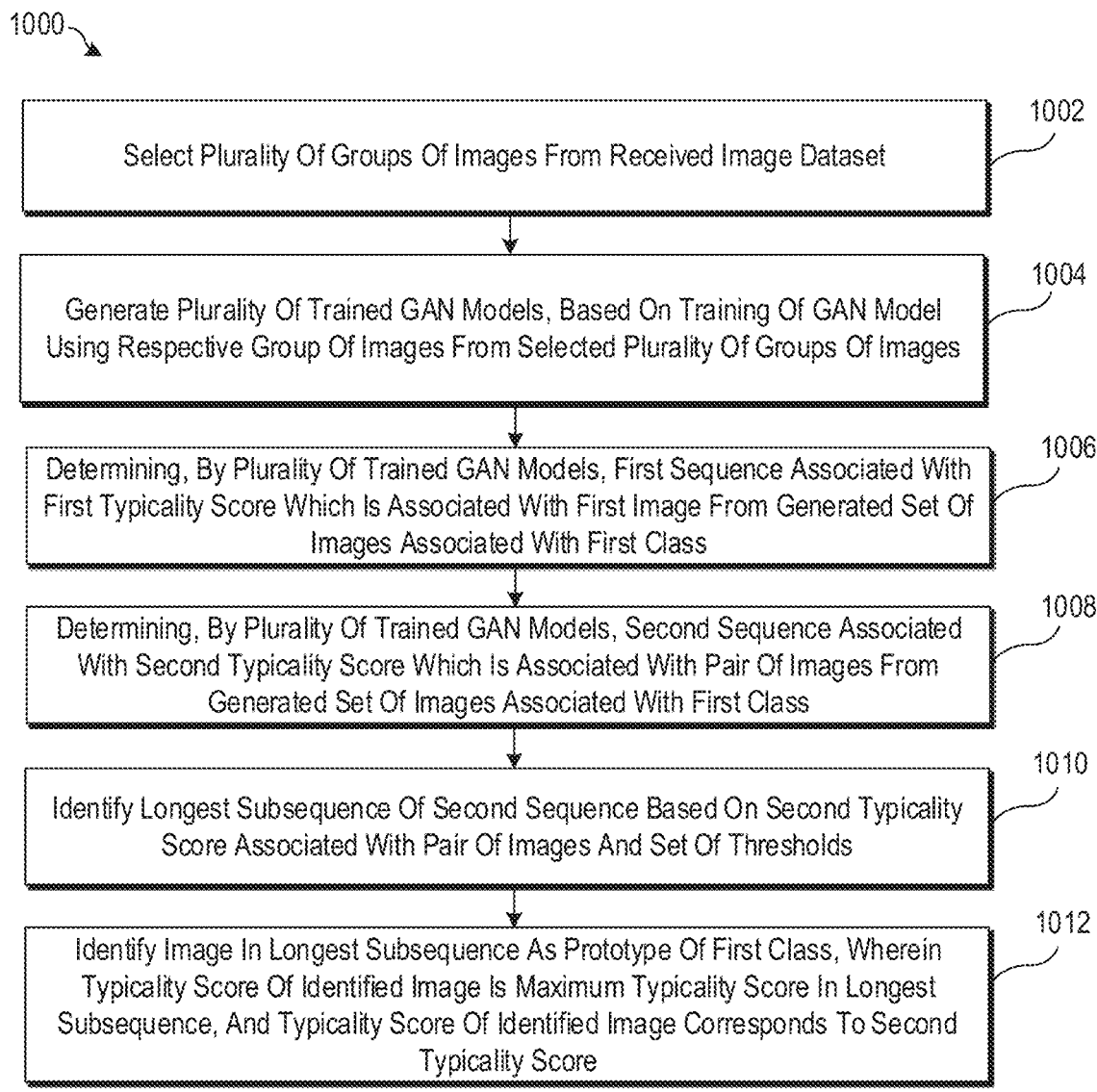
FIG. 10 is a diagram that illustrates a flowchart of an example method for identification of an image from a set of images generated by a Generative Adversarial Network (GAN) model as a prototype of a first class associated with a received image dataset.

FIG. 10 is a diagram that illustrates a flowchart of an example method for identification of an image from a set of images generated by a Generative Adversarial Network (GAN) model as a prototype of a first class associated with a received image dataset, in accordance with an embodiment of the disclosure. FIG. 10 is described in conjunction with elements from FIG. 1, FIG. 2, FIG. 3, FIG. 4, FIG. 5, FIG. 6, FIG. 7, FIG. 8, and FIG. 9. With reference to FIG. 10, there is shown a flowchart 1000. The method illustrated in the flowchart 1000 may start at 1002 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 1000 may be divided into additional blocks, combined into fewer blocks, or eliminated, depending on the particular implementation.

At block 1002, a plurality of groups of images may be selected from the received image dataset 114. In an embodiment, the processor 204 may be configured to select the plurality of groups of images from the received image dataset 114. In an embodiment, a number of images in each of the plurality of groups of images may be different. In another embodiment, a number of image in each of the plurality of groups may be the same. In certain embodiments, each of the plurality of groups may include different images from the received image dataset 114. In another embodiment, at least two of the plurality of groups may include at least one common image from the received image dataset 114.

At block 1004, a plurality of trained GAN models may be generated, based on a training of the GAN model 108 using a respective group of images from the selected plurality of groups of images. In an embodiment, the processor 204 may be configured to generate the plurality of trained GAN models (for example, the plurality of GAN models 216 based on a training of the GAN model 108 using a respective group of images from the selected plurality of groups of images. For example, based on a first group of images from the selected plurality of groups of images, the processor 204 may execute a first training of the GAN model 108 to generate a first trained GAN model from the plurality of GAN models 216. In an example, the first group of images may include N images, such as, images $I_1, I_2, I_3 \ldots I_N$. Further, based on a second group of images from the selected plurality of groups of images, the processor 204 may execute a second training of the GAN model 108 to generate a second trained GAN model from the plurality of GAN models 216. In an example, the second group of images may include N+1 images, such as, images $I_1, I_2, I_3 \ldots I_{N+1}$. The training of the GAN model 108 is described further, for example, in FIG. 3.

At block 1006, a first sequence associated with the first typicality score may be determined by the plurality of trained GAN models (for example, the plurality of GAN models 216). The first typicality score may be associated with the first image from the generated set of images which may be further associated with the first class. In an embodiment, the processor 204 may be configured to determine, by the plurality of trained GAN models, the first sequence associated with the first typicality score. To determine the first sequence (e.g., T), the processor 204 may use the first trained GAN model from the plurality of GAN models 216 to generate a first value of the first typicality score for the first image. Further, the processor 204 may use the second trained GAN model from the plurality of GAN models 216 to generate a second value of the first typicality score for the first image. In an example, the first sequence associated with the first typicality score may be represented by following expression:

$$T = \langle t_1, t_2, \ldots t_n \rangle \qquad (22)$$

With reference to expression (22), "$t_1$" may represent the first typicality score determined based on the first trained GAN model from the plurality of GAN models 216, and "$t_2$" may represent the first typicality score determined based on the second trained GAN model from the plurality of GAN models 216. Similarly, "$t_n$" may represent the first typicality score determined based on an nth trained GAN model from the plurality of GAN models 216. Each of the first typicality scores in the expression (22) may be associated with the first image associated with the first class. The length of the first sequence may correspond to a number (e.g., n) of the plurality of trained GAN models. The determination of the first typicality score is described further, for example, in FIG. 7.

At block 1008, a second sequence associated with the second typicality score may be determined by the plurality of trained GAN models (for example, the plurality of GAN models 216). The second typicality score may be associated with the pair of images from the generated set of images associated with the first class. In an embodiment, the processor 204 may be configured to determine, by the plurality of trained GAN models, the second sequence associated with the second typicality score. In an embodiment, a third image of the pair of images may be generated based on the first trained GAN model from the plurality of GAN models 216 and a fourth image of the pair of images may be generated based on the second trained GAN model from the plurality of GAN models 216. In an embodiment, the first trained GAN model may be trained based on a first group of images from the selected group of images and the second trained GAN model may be trained based on a second group of images from the selected group of images. Herein, a number of the first group of images may be different from a number of the second group of images. For example, the first group of images may include N images from the received image dataset 114 and the second group of images may include N+1 images from the received image dataset 114. In certain embodiments, at least one image may be common between the first group of images and the second group of images. In another embodiment, the first group of images and the second group of images may not have any common images.

To determine the second sequence (e.g., G), the processor 204 may use the first trained GAN model from the plurality of GAN models 216 to generate a first value (e.g., $g_{1,2}$) of the second typicality score between a first pair of generated images (e.g., the third image and the fourth image). Further, the processor 204 may use the second trained GAN model from the plurality of GAN models 216 to generate a second value (e.g., $g_{2,3}$) of the second typicality score between a second pair of generated images. In an embodiment, the second sequence associated with the second typicality score may be determined between adjacent generated image pairs such that the pair of images may be arranged based on a number of training instances of the particular GAN model used for the generated of each image. As an example, the third image may be generated using the first trained GAN model, which may be trained on N images, while the fourth image may be generated using the second trained GAN model, which may be trained on N+1 images. Further, a fifth image of the second pair of generated images may be generated using a third trained GAN model, which may be trained on N+2 images, while a sixth image of the second pair of generated images may be generated using a fourth trained GAN model, which may be trained on N+3 images. In an example, the second sequence associated with the second typicality score may be represented by following expression:

$$G = \{g_{1,2}, g_{2,3}, \ldots g_{(n-1),n}\} \quad (23)$$

The determination of the second typicality score is described further, for example, in FIG. 8.

At block 1010, a longest subsequence of the second sequence may be identified based on the second typicality score associated with the pair of images and a set of thresholds. In an embodiment, the processor 204 may be configured to identify the longest subsequence (e.g., L) of the second sequence based on the second typicality score associated with the pair of images and the set of thresholds. In an embodiment, the longest subsequence (e.g., L) of the second sequence (e.g., G) may be identified such that following conditions may be satisfied:

$$|g_{i,i+1} - g_{i+1,i+2}| \leq \delta \quad (24)$$

$$t_i > \alpha_i \quad (25)$$

where,
  i may represent an $i^{th}$ generated image;
  δ and a may represent the set of thresholds; and
  $t_i$ may represent a typicality score of an image "i" in the longest sub-sequence L.

The longest subsequence may be identified using an algorithm or technique known in the art, and thus further details related to the identification of the longest subsequence are omitted for the sake of brevity. In an embodiment, the set of thresholds may be determined based on a variance of one or more of the first sequence (i.e., T) and the second sequence (i.e., G).

In an embodiment, in case the processor 204 determines that no such longest subsequence exists for the first class, then the processor 204 may determine that the first class may be a style-heavy class. A style-heavy class may include a few common typical features between images of the class. In such case, control may pass to end. However, in case the processor 204 determines that the longest subsequence (e.g., L) does exist for the first class, then the processor 204 may determine that the first class may be a content-heavy class. A content-heavy class may include a plurality of common typical features between images of the class. In such case, control may pass to block 1012.

At block 1012, an image (e.g., I) in the longest subsequence (e.g., L) may be identified as a prototype of the first class. In an embodiment, the processor 204 may be configured to identify the image (e.g., I) in the longest subsequence (e.g., L) as the prototype of the first class. A typicality score (e.g., $t_1$) of the identified image (e.g., I) may be a maximum typicality score in the longest subsequence (e.g., L). Further, the typicality score (e.g., $t_I$) of the identified image may correspond to the second typicality score. Thus, to identify the image as the prototype of the first class, the processor 204 may search for an image with a highest typicality score in the longest subsequence (e.g., L), and identify the image with the highest typicality score as the prototype of the first class. In an embodiment, the typicality score (i.e., $t_I$) of the identified image (i.e., I) may be indicative of a measure of the content embedded in the image (i.e., I) with respect to the first class. The processor 204 may also identify content prototype attributes (e.g., a(I)) for the first class based on the identified image (e.g., I) that corresponds to the prototype. The content prototype attributes for the first class may correspond to attributes of the image identified as the prototype of the first class. The determination of the content prototype attributes for the first class is described further, for example, in FIG. 9.

In an embodiment, the processor 204 may be configured to determine second interpretability coefficient associated with the trained GAN model 108 based on a typicality score (for example, the first typicality score) of the first image with respect to a training image dataset (e.g., the first set of images). The determination of the second interpretability coefficient may be further based on the typicality score (i.e., $t_I$) of the image identified as the prototype of the first class.

The processor 204 may use following equation to determine the second interpretability coefficient:

$$IC_2 = 1 - |t_I - t_x| \quad (26)$$

where,

IC$_2$ may represent the second interpretability coefficient;

t$_I$ may represent the typicality score of the image "I" identified as the prototype of the first class; and t$_x$ may represent a typicality score (e.g., the first typicality score) of the first image from the set of images generated by the GAN model 108.

The determination of the first typicality score is described further, for example, in FIGS. 3 and 7. The determination of the interpretability score associated with the trained GAN model 108 is described further, for example, in FIG. 3. An example of the determination of the interpretability score is described further, for example, in FIGS. 11A, 11B, 1A, and 12B. Control may pass to end.

Although the flowchart 1000 is illustrated as discrete operations, such as 1002, 1004, 1006, 1008, 1010, and 1012. However, in certain embodiments, such discrete operations may be further divided into additional operations, combined into fewer operations, or eliminated, depending on the particular implementation without detracting from the essence of the disclosed embodiments.

Figure 11A:
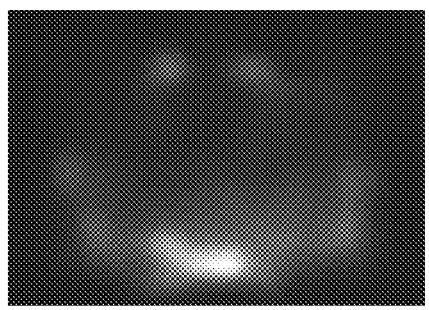
FIG. 11A is diagram that illustrate an example first saliency map associated with a first image from a set of images generated by a Generative Adversarial Network (GAN) model.
Figure 11B:
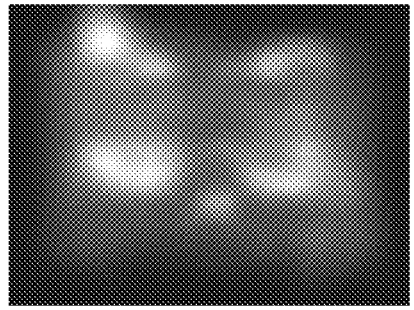
FIG. 11B is diagram that illustrate an example second saliency map associated with a second image from a received image dataset.

FIG. 11A is diagram that illustrate an example first saliency map associated with a first image from a set of images generated by a Generative Adversarial Network (GAN) model, in accordance with an embodiment of the disclosure. FIG. 11B is diagram that illustrate an example second saliency map associated with a second image from a received image dataset, in accordance with an embodiment of the disclosure. FIGS. 11A and 11B are described in conjunction with elements from FIG. 1, FIG. 2, FIG. 3, FIG. 4, FIG. 5, FIG. 6, FIG. 7, FIG. 8, FIG. 9, and FIG. 10.

With reference to FIG. 11A, there is shown an example first saliency map 1100A. Further, with reference to FIG. 11B, there is shown an example second saliency map 1100B. The first saliency map 1100A may be associated with the first image from the set of images generated by the GAN model 108. Further, the second saliency map 1100B may be associated with the second image from the received image dataset 114. The first image and the second may correspond to the same class, such as, the first class. In an example, the first class may be a "cat" image. As an example, a region of overlap between the first saliency map 1100A and the second saliency map 1100B may be equal to "0.5". Thus, as described further, for example, in FIG. 5, based on equation (2), the processor 204 may determine the first interpretability coefficient as "0.5".

Figure 12A:
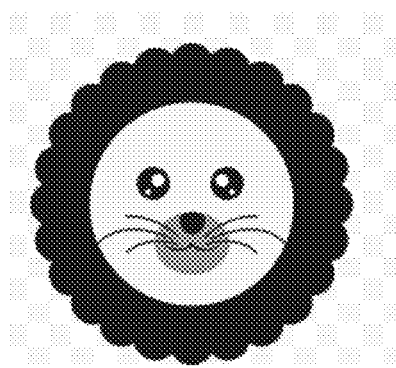
FIG. 12A is diagram that illustrate an example first image from a set of images generated by a Generative Adversarial Network (GAN) model.
Figure 12B:
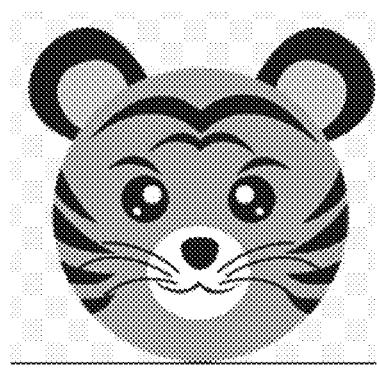
FIG. 12B is diagram that illustrate an example image identified as a prototype of a first class, all according to at least one embodiment described in the present disclosure.

FIG. 12A is diagram that illustrate an example first image from a set of images generated by a Generative Adversarial Network (GAN) model, in accordance with an embodiment of the disclosure. FIG. 12B is diagram that illustrate an example image identified as a prototype of a first class, in accordance with an embodiment of the disclosure. FIGS. 12A and 12B are described in conjunction with elements from FIG. 1, FIG. 2, FIG. 3, FIG. 4, FIG. 5, FIG. 6, FIG. 7, FIG. 8, FIG. 9, FIG. 10, FIG. 11A, and FIG. 11B.

With reference to FIG. 12A, there is shown an example first image 1200A. Further, with reference to FIG. 12B, there is shown an example prototype image 1200B. The first image 1200A may belong to the set of images generated by the GAN model 108. Further, the first image 1200A may be associated with the first class. The prototype image 1200B may be identified as a prototype of the first class, as described further, for example, in FIG. 10. The first image and the prototype may correspond to the same class, such as the first class. In an example, the first class may be a "cat" image. As an example, a typicality (which may be denoted by t$_x$) of the first image 1200A may be "0.4". Also, a typicality (which may be denoted by t$_I$) of the prototype image 1200B may be "0.9". Thus, as described further, for example, in FIG. 10, based on equation (26), the processor 204 may determine the second interpretability coefficient as "0.5" (i.e., 1−(0.9−0.4)).

With reference to FIGS. 11A, 11B, 12A, and 12B, in an example, the processor 204 may determine the interpretability score associated with the trained GAN model 108 based on the first interpretability coefficient (e.g., "0.5") and the second interpretability coefficient (e.g., "0.5"). The processor 204 may use equation (1) to determine the interpretability score, as described further, for example, in FIG. 3 (at 320). As an example, in case, the weights w1 and w2 are both equal to "0.5" in equation (1), the processor 204 may determine the interpretability score as (0.5*0.5+0.5*0.5), i.e., "0.5".

It may be noted that the first saliency map 1100A, the second saliency map 1100B, the first image 1200A, and the prototype image 1200B shown in FIGS. 11A, 11B, 12A, and 12B, respectively, are presented merely as examples and should not be construed to limit the scope of the disclosure.

The disclosed electronic device 102 may be configured to analyze the interpretability of the set of images generated by the GAN model 108 based on the determination of the interpretability score associated with the GAN model 108. The electronic device 102 may determine the first interpretability coefficient associated with the GAN model 108 based on the first saliency map associated with the first image generated by the GAN model 108, and also based on the second saliency map associated with the second image in the received image dataset 114 of training images. The electronic device 102 may also determine the second interpretability coefficient associated with the GAN model 108 based on the first typicality score between training images (e.g., the first set of images) and the first image, and also based on the second typicality score between a pair of images from the generated set of images. Finally, the electronic device 102 may determine the interpretability score associated with the GAN model 108 based on a combination (e.g., a weighted combination) of the first interpretability coefficient and the second interpretability coefficient. As the computation of the interpretability score does not require human labeling, such computation may be efficient and automated. Further, the weights associated with the interpretability coefficients may be adjusted to suite an application area where the GAN model 108 may be used. The interpretability score associated with a GAN model may be indicative of a trustworthiness of images generated by the respective GAN model. The interpretability scores of GAN models may also be used to compare different GAN models. Also, the interpretability scores may be used to understand an underlying learning process of AI models, such as GAN models, and also aid in development of human interpretable AI systems.

Typically, conventional systems may require human input, such as, human labeling of datapoints (e.g., images) for analysis of interpretability of an AI model, such as, a GAN model. Thus, conventional systems may be computationally inefficient and may not be fully automated. Further, the conventional systems may be prone to human biases associated with the labeled datapoints being analyzed. Also, scalability of the convention systems to a large set of datapoints may be an issue due to the requirement of a human input. The disclosed electronic device 102, on the other hand, may be unsupervised and may not require human labeling. Thus, the disclosed electronic device 102 may be computationally more efficient, easily automated, and scaled seamlessly. Also, the disclosed electronic device 102 may not be prone to human biases as human labeled datapoints may not be used for the interpretability score determination.

Various embodiments of the disclosure may provide one or more non-transitory computer-readable storage media configured to store instructions that, in response to being executed, cause a system (such as, the example electronic device 102) to perform operations. The operations may include receiving an image dataset. The operations may further include training a Generative Adversarial Network (GAN) model based on the received image dataset. The operations may further include generating, by the GAN model, a set of images each associated with a first class from a set of classes associated with the received image dataset. The operations may further include determining, by a neural network model different from the GAN model, a first saliency map associated with a first image from the generated set of images. The operations may further include determining, by the neural network model, a second saliency map associated with a second image from the received image dataset, the second image is associated with the first class. The operations may further include determining a first interpretability coefficient associated with the trained GAN model, based on the determined first saliency map and the determined second saliency map. The operations may further include determining a first typicality score between a first set of images from the received image dataset and the first image, based on the trained GAN model, wherein each of the first set of images is associated with the first class. The operations may further include determining a second typicality score between a pair of images from the generated set of images, based on the trained GAN model. The operations may further include determining a second interpretability coefficient associated with the trained GAN model, based on the determined first typicality score and the determined second typicality score. The operations may further include determining an interpretability score associated with the trained GAN model based on the determined first interpretability coefficient and the determined second interpretability coefficient. The operations may further include rendering the determined interpretability score on a display device.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
receiving an image dataset;
training a Generative Adversarial Network (GAN) model based on the received image dataset;
generating, by the GAN model, a set of images each associated with a first class from a set of classes associated with the received image dataset;
determining, by a neural network model different from the GAN model, a first saliency map associated with a first image from the generated set of images;
determining, by the neural network model, a second saliency map associated with a second image from the received image dataset, the second image is associated with the first class;

determining a first interpretability coefficient associated with the trained GAN model, based on the determined first saliency map and the determined second saliency map;
determining a first typicality score between a first set of images from the received image dataset and the first image, based on the trained GAN model, each of the first set of images is associated with the first class;
determining a second typicality score between a pair of images from the generated set of images, based on the trained GAN model;
determining a second interpretability coefficient associated with the trained GAN model, based on the determined first typicality score and the determined second typicality score;
determining an interpretability score associated with the trained GAN model based on the determined first interpretability coefficient and the determined second interpretability coefficient; and
rendering the determined interpretability score on a display device.

2. The method according to claim 1, wherein the determination of the first saliency map associated with the first image from the generated set of images further comprises:
applying the neural network model on the first image;
determining a set of feature maps of the first image based on the application of the neural network model on the first image;
enhancing, based on an Attentive model, a set of salient features from the determined set of feature maps; and
determining the first saliency map based on a combination of the enhanced set of salient features and a set of learned priors associated with saliency maps.

3. The method according to claim 2, wherein the neural network model corresponds to a Dilated Convolution Neural Network model or a deep neural network model.

4. The method according to claim 2, wherein the Attentive model corresponds to an Attentive Convolutional Long Short-Term Memory network (LSTM) model.

5. The method according to claim 1, wherein the second image from the received image dataset corresponds to an average image associated with the first class, and wherein the average image of the first class corresponds to an image whose feature vector corresponds to an average feature vector of each image of the first class, from the received image dataset.

6. The method according to claim 1, further comprising:
determining a region of overlap between the determined first saliency map and the determined second saliency map; and
determining the first interpretability coefficient associated with the trained GAN model, based on the determined region of overlap and the determined second saliency map.

7. The method according to claim 1, further comprising:
determining a first set of distributions of feature vectors of the first set of images from the received image dataset;
determining, by the trained GAN model, a first set of sample sequences associated with the first image from the generated set of images; and
determining the first typicality score based on the determined first set of sample sequences and the determined first set of distributions.

8. The method according to claim 1, further comprising:
selecting the pair of images from the generated set of images;
determining a second set of distributions of feature vectors of a third image from the selected pair of images;
determining, by the trained GAN model, a second set of sample sequences associated with a fourth image from the selected pair of images; and
determining the second typicality score based on the determined second set of sample sequences and the determined second set of distributions.

9. The method according to claim 1, further comprising:
identifying content prototype attributes for the first class based on the determined first typicality score and the determined second typicality score; and
rendering the identified content prototype attributes for the first class.

10. The method according to claim 1, further comprising:
selecting a plurality of groups of images from the received image dataset;
generating a plurality of trained GAN models, based on training of the GAN model using a respective group of images from the selected plurality of groups of images; and
determining, by the plurality of trained GAN models, a first sequence associated with the first typicality score which is associated with the first image from the generated set of images associated with the first class.

11. The method according to claim 10, further comprising determining, by the plurality of trained GAN models, a second sequence associated with the second typicality score which is associated with the pair of images from the generated set of images associated with the first class.

12. The method according to claim 11, wherein
a third image of the pair of images is generated based on a first trained GAN model from the plurality of trained GAN models, and
a fourth image of the pair of images is generated based on a second trained GAN model from the plurality of trained GAN models.

13. The method according to claim 12, wherein
the first trained GAN model is trained based on a first group of images from the selected plurality of groups of images,
the second trained GAN model is trained based on a second group of images from the selected plurality of groups of images, and
a number of the first group of images is different from a number of the second group of images.

14. The method according to claim 11, further comprising identifying a longest subsequence of the second sequence based on the second typicality score associated with the pair of images and a set of thresholds.

15. The method according to claim 14, wherein each of the set of thresholds are determined based on a variance of one or more of the first sequence and the second sequence.

16. The method according to claim 14, further comprising identifying an image in the longest subsequence as a prototype of the first class, wherein a typicality score of the identified image is a maximum typicality score in the longest subsequence, and the typicality score of the identified image corresponds to the second typicality score.

17. One or more non-transitory computer-readable storage media configured to store instructions that, in response to being executed, cause an electronic device to perform operations, the operations comprising:
receiving an image dataset;
training a Generative Adversarial Network (GAN) model based on the received image dataset;

generating, by the GAN model, a set of images each associated with a first class from a set of classes associated with the received image dataset;

determining, by a neural network model different from the GAN model, a first saliency map associated with a first image from the generated set of images;

determining, by the neural network model, a second saliency map associated with a second image from the received image dataset, the second image is associated with the first class;

determining a first interpretability coefficient associated with the trained GAN model, based on the determined first saliency map and the determined second saliency map;

determining a first typicality score between a first set of images from the received image dataset and the first image, based on the trained GAN model, each of the first set of images is associated with the first class;

determining a second typicality score between a pair of images from the generated set of images, based on the trained GAN model;

determining a second interpretability coefficient associated with the trained GAN model, based on the determined first typicality score and the determined second typicality score;

determining an interpretability score associated with the trained GAN model based on the determined first interpretability coefficient and the determined second interpretability coefficient; and rendering the determined interpretability score on a display device.

18. The one or more non-transitory computer-readable storage media according to claim 17, wherein the operations further comprise:

determining a region of overlap between the determined first saliency map and the determined second saliency map; and determining the first interpretability coefficient associated with the trained GAN model, based on the determined region of overlap and the determined second saliency map.

19. The one or more non-transitory computer-readable storage media according to claim 17, wherein the operations further comprise:

determining a first set of distributions of feature vectors of the first set of images from the received image dataset;

determining, by the trained GAN model, a first set of sample sequences associated with the first image from the generated set of images;

determining the first typicality score based on the determined first set of sample sequences and the determined first set of distributions;

selecting the pair of images from the generated set of images;

determining a second set of distributions of feature vectors of a third image from the selected pair of images;

determining, by the trained GAN model, a second set of sample sequences associated with a fourth image from the selected pair of images; and determining the second typicality score based on the determined second set of sample sequences and the determined second set of distributions.

20. An electronic device, comprising:

a memory configured to store instructions; and a processor, coupled to the memory, that is configured to execute the instructions to perform a process comprising:

receiving an image dataset;

training a Generative Adversarial Network (GAN) model based on the received image dataset;

generating, by the GAN model, a set of images each associated with a first class from a set of classes associated with the received image dataset;

determining, by a neural network model different from the GAN model, a first saliency map associated with a first image from the generated set of images;

determining, by the neural network model, a second saliency map associated with a second image from the received image dataset, the second image is associated with the first class;

determining a first interpretability coefficient associated with the trained GAN model, based on the determined first saliency map and the determined second saliency map;

determining a first typicality score between a first set of images from the received image dataset and the first image, based on the trained GAN model, each of the first set of images is associated with the first class;

determining a second typicality score between a pair of images from the generated set of images, based on the trained GAN model;

determining a second interpretability coefficient associated with the trained GAN model, based on the determined first typicality score and the determined second typicality score;

determining an interpretability score associated with the trained GAN model based on the determined first interpretability coefficient and the determined second interpretability coefficient; and rendering the determined interpretability score on a display device.

* * * * *